US012720149B2

(12) United States Patent
Gao

(10) Patent No.: US 12,720,149 B2
(45) Date of Patent: Aug. 25, 2026

(54) SCREEN RECORDING METHOD AND ELECTRONIC DEVICE

(71) Applicant: HONOR DEVICE CO., LTD., Shenzhen (CN)

(72) Inventor: Wei Gao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/993,956

(22) PCT Filed: Aug. 26, 2023

(86) PCT No.: PCT/CN2023/115113
§ 371 (c)(1),
(2) Date: Jan. 13, 2025

(87) PCT Pub. No.: WO2024/103894
PCT Pub. Date: May 23, 2024

(65) Prior Publication Data

US 2026/0019662 A1 Jan. 15, 2026

(30) Foreign Application Priority Data

Nov. 17, 2022 (CN) ......................... 202211442149.6

(51) Int. Cl.
*H04N 21/43* (2011.01)
*H04N 21/431* (2011.01)
(Continued)

(52) U.S. Cl.
CPC ..... *H04N 21/4334* (2013.01); *H04N 21/4316* (2013.01); *H04N 21/4788* (2013.01)

(58) Field of Classification Search
CPC ........... H04N 21/4334; H04N 21/4316; H04N 21/4788; H04N 21/4312; G06F 3/0481; G06F 3/04886; G06F 2203/04803
See application file for complete search history.

(56) References Cited

U.S. PATENT DOCUMENTS 11,747,969 B1 * 9/2023 Karunamuni ......... G06F 3/0484 715/767
2005/0064911 A1 * 3/2005 Chen ................. H04M 1/72403 455/566
(Continued)

FOREIGN PATENT DOCUMENTS

CN 102790921 A 11/2012
CN 104967802 A 10/2015
(Continued)

*Primary Examiner* — Timothy R Newlin
(74) *Attorney, Agent, or Firm* — WOMBLE BOND DICKINSON (US) LLP

(57) ABSTRACT

This application provides a screen recording method and an electronic device. The method includes: displaying a first interface of a first application, where the first interface includes a first area and a second area, the first area is a video playing area, and the second area is a non-video-playing area; in response to a first tap/click operation on a start recording button, recording, by using a video note application, display content corresponding to the first area; in response to a first tap/click operation on an end recording button, ending recording to obtain a first video; in response to a first user operation, displaying a second interface of the first application, where the second interface does not include a video playing area.

20 Claims, 19 Drawing Sheets

(51) Int. Cl.
*H04N 21/433* (2011.01)
*H04N 21/4788* (2011.01)

(56) References Cited

U.S. PATENT DOCUMENTS

2014/0033040 A1* 1/2014 Thomas .............. G06F 9/44505 715/721
2019/0065240 A1* 2/2019 Kong .................. G06F 3/04886
2020/0382828 A1* 12/2020 Chen .................. H04N 21/4147
2021/0051231 A1* 2/2021 Cohen .................. H04N 9/8205
2021/0200398 A1* 7/2021 Zhou ....................... G06F 3/147
2022/0011925 A1* 1/2022 Tao ........................... G06F 3/16
2022/0300154 A1* 9/2022 Li ......................... G06F 3/0481
2022/0326823 A1* 10/2022 Fang ..................... G06F 3/0481
2022/0400307 A1* 12/2022 Martin ............... H04N 21/2343
2023/0216948 A1* 7/2023 Ahn .................... H04M 1/0235 455/575.4
2023/0269437 A1* 8/2023 Fang ...................... H04N 7/147 725/37
2023/0393718 A1* 12/2023 Ye ......................... G06F 3/0484
2024/0211116 A1* 6/2024 Yang ..................... G06F 3/0486
2024/0334005 A1* 10/2024 Ma .......................... A63F 13/86

FOREIGN PATENT DOCUMENTS

CN 204887304 U 12/2015
CN 107465958 A 12/2017
CN 108924452 A 11/2018
CN 110417991 A 11/2019
CN 111556371 A 8/2020
CN 112087657 A 12/2020
CN 112688931 A 4/2021
CN 114189582 A 3/2022
WO 2022089034 A1 5/2022

* cited by examiner

SCREEN RECORDING METHOD AND ELECTRONIC DEVICE

CROSS-REFERENCE TO RELATED APPLICATIONS

This application is a National Stage of International Application No. PCT/CN2023/115113, filed on Aug. 26, 2023, which claims priority to Chinese Patent Application No. 202211442149.6, filed on Nov. 17, 2022, both of which are hereby incorporated by reference in their entireties.

TECHNICAL FIELD

This application relates to the field of computers, and in particular, to a screen recording method and an electronic device.

BACKGROUND

With the development of digital media, to record content or operations displayed on an electronic device for sharing and saving, a screen recording function has emerged.

The screen recording function includes area recording, which is specifically performing screen recording based on an area selected by a user autonomously through tapping/clicking and dragging. However, this method relies on selection performed by the user autonomously through tapping/clicking and dragging to determine a record area, resulting in high user operation costs. For example, high time costs are spent defining a record area through tapping/clicking and dragging.

Therefore, how to provide a screen recording method to reduce user operation costs of the area recording function has become an important research topic in the technical field.

SUMMARY

The present invention provides a screen recording method, where screen recording is performed based on content currently displayed on a display screen, to alleviate a problem of user operation costs of an area recording function.

According to a first aspect, this application provides a screen recording method. The method includes: starting a first application, and displaying a first interface of the first application, where the first interface includes a first area and a second area, the first area is a video playing area, and the second area is a non-video-playing area; in response to a user operation of calling up a function bar of a video note application, displaying the function bar, where the function bar includes a start recording button, and the video note application includes a screen recording function; in response to a first tap/click operation on the start recording button, recording, by using the video note application, display content corresponding to the first area, and displaying an end recording button and skipping displaying the start recording button in the function bar; in response to a first tap/click operation on the end recording button, ending recording to obtain a first video, and displaying the start recording button and skipping displaying the end recording button in the function bar, where the first video includes the display content in the first area and does not include display content in the second area; in response to a first user operation, displaying a second interface of the first application, where the second interface does not include a video playing area;

in response to a second tap/click operation on the start recording button, recording display content of an entire interface of the second interface by using the video note application, and displaying the end recording button and skipping displaying the start recording button in the function bar; and in response to a second tap/click operation on the end recording button, ending recording to obtain a second video, and displaying the start recording button and skipping displaying the end recording button in the function bar, where the second video includes all the display content of the second interface.

In this application, the first interface and the second interface are both entire interfaces corresponding to the first application. For example, the first application supports video playing, and the first area in the first interface is a video playing area in which a video is played by using the first application.

For example, the first application is a preset application for which the video note application supports recording, and a view corresponding to the first area is an area corresponding to a preset view that belongs to the first application and for which the video note application supports recording. For example, a user may customize a list of applications and a list of views for which the video note application is expected to support and/or not to support recording.

For example, the display content in the first area includes video content, and may further include bullet comment content.

In some other screen recording methods, during screen recording, display content in an entire display area of a display screen is recorded by default, and area recording is not supported, which leads to a large probability that recorded screen data obtained through recording includes a picture that the user does not want to record, and results in a problem that the recorded screen data has a large data volume and causes storage pressure to an electronic device, and the like.

However, according to the method provided in this application, when a screen recording instruction is received and an interface currently displayed on the display screen includes the first area (video playing area), the display content corresponding to the first area is recorded instead of full-screen recording. In this way, a video area recording requirement of the user is met, and the problem that recorded screen data has a large data volume and causes high storage pressure is alleviated. In addition, if the interface currently displayed on the display screen is the second interface that does not include a video playing area, the entire interface of the second interface is recorded. To be specific, when a recording requirement of the user is not video area recording, the entire currently displayed interface (second interface) of the first application is recorded. This meets different recording requirements of the user in different scenarios.

In some other screen recording methods, in a screen area recording scenario, the user needs to select a display area autonomously through tapping/clicking and dragging, and recorded screen data is obtained in a screenshot manner during recording. The record area selection requires high operation costs, and a large volume of area screenshot data is generated during screen recording, which occupies a large internal memory space.

However, according to the method provided in this application, when the screen recording instruction is received and the display screen currently displays the first interface including the first area, the display content corresponding to the first area automatically starts to be recorded. When the display screen currently displays the second interface that does not include a video playing area, the display content of the entire interface of the second interface automatically starts to be recorded. The user does not need to perform tapping/clicking or dragging to select a display area, so that the problem of high user operation costs is alleviated. In addition, according to the method provided in this application, during screen recording, a screen recording application in the electronic device is invoked to record the display content in the first area, instead of obtaining recorded screen data in a screenshot manner, so that the problem of occupying an internal memory space due to a large volume of area screenshot data generated during screen recording is alleviated.

In this application, tap/click operations on the start recording button are described as a first tap/click operation, a second tap/click operation, a third tap/click operation, a fourth tap/click operation, and the like to distinguish a tap/click operation in a current scenario from another tap/click operation in another scenario, rather than indicate that there are different tap/click manners, or referred to as trigger manners, for the start recording button.

For example, the user operation of calling up the function bar of the video note application is a preset shortcut key operation. For example, the shortcut key operation may be a combination of physical buttons or a virtual button (for example, three-finger slide down).

In some descriptions of this application, the start recording button is also referred to as a start recording icon, and the end recording button is also referred to as an end recording icon.

In a possible implementation, after the ending recording, the method further includes: in response to a second user operation, displaying the second interface and an interface of a second application in a split-screen display manner, where the interface of the second application does not include a video playing area; in response to a third tap/click operation on the start recording button, recording the display content of the entire interface of the second interface by using the video note application, and displaying the end recording button and skipping displaying the start recording button in the function bar; and in response to a third tap/click operation on the end recording button, ending recording to obtain a third video, and displaying the start recording button and skipping displaying the end recording button in the function bar, where the third video includes all the display content of the second interface and does not include display content of the interface of the second application.

It may be understood that, the "after the ending recording" described herein may be after the ending recording in the foregoing "in response to a first tap/click operation on the end recording button, ending recording", or after the ending recording in the foregoing "in response to a second tap/click operation on the end recording button, ending recording". This is not limited herein.

For example, the second application may be an application that does not support video playing, and no interface of the second application includes a video playing area. For example, the second application is not included in the preset list of applications for which the video note application supports recording.

According to the method provided in this application, when the screen recording instruction is received and the display screen currently displays the second interface of the first application and the interface of the second application, the second interface of the first application is recorded, and the interface of the second application is not recorded. In other words, full-screen recording is not performed blindly. This further meets a video area recording requirement of the user in a different scenario (for example, a screen area recording requirement in a split-screen scenario), and alleviates the problem that recorded screen data has a large data volume and causes high storage pressure. In addition, the user does not need to perform tapping/clicking or dragging to select an area to be recorded, which further alleviates the problem of operation costs of the screen area recording requirement of the user in the different scenario.

In a possible implementation, after the ending recording, the method further includes: in response to a third user operation, displaying the interface of the second application and an interface of a third application in a split-screen display manner, where the interface of the third application does not include a video playing area; in response to a fourth tap/click operation on the start recording button, recording display content in an entire display area of the display screen by using the video note application, and displaying the end recording button and skipping displaying the start recording button in the function bar; and in response to a fourth tap/click operation on the end recording button, ending recording to obtain a fourth video, where the fourth video includes display content of the interface of the second application and the interface of the third application.

It may be understood that, the "after the ending recording" described herein may be after the ending recording in the foregoing "in response to a first tap/click operation on the end recording button, ending recording", or after the ending recording in the foregoing "in response to a second tap/click operation on the end recording button, ending recording", or after the ending recording in the foregoing "in response to a third tap/click operation on the end recording button, ending recording". This is not limited herein.

For example, the third application is an application that does not support video playing, and no interface of the third application includes a video playing area. For example, the third application is not included in the preset list of applications for which the video note application supports recording.

According to the method provided in this application, when the screen recording instruction is received and the display screen currently displays the interface of the second application and the interface of the third application, the entire display area of the display screen is recorded. In other words, when none of the interfaces displayed on the display screen includes an interface of an application for which the video note application supports recording, full-screen recording is performed. This further meets a full-screen recording requirement of the user in a corresponding scenario. In addition, the user does not need to perform tapping/clicking or dragging to select an area to be recorded, which further alleviates the problem of operation costs of the full-screen recording requirement of the user in the corresponding scenario.

In a possible implementation, the method further includes: in response to the first tap/click operation on the start recording button, displaying an interface of the video note application in a floating-window display manner, and displaying a preview image in a preview area of the interface of the video note application; and displaying a preview image and a playing icon in the preview area in response to the first tap/click operation on the end recording button, and playing the first video in response to a tap/click operation on the playing icon.

In a possible implementation, the method further includes: in response to the second tap/click operation on the start recording button, displaying an interface of the video note application in a floating-window display manner, and displaying a preview image in a preview area of the interface of the video note application; and displaying a preview image and a playing icon in the preview area in response to the second tap/click operation on the end recording button, and playing the first video in response to a tap/click operation on the playing icon.

In a possible implementation, an identifier of the first application is included in an application whitelist, identification information of the view corresponding to the first area is included in a view whitelist, identification information of a view corresponding to the second area is not included in the view whitelist, neither an identifier of the second application nor an identifier of the third application is included in the application whitelist, the application whitelist is used to record a preset list of identification information of applications for which the video note application supports recording, the view whitelist is used to record a preset list of identification information of views for which the video note application supports recording, and each view in the view whitelist comes from a corresponding application in the application whitelist.

For example, each application in the application whitelist is an application including a video playing function, and each view in the view whitelist is a view configured to play video data.

For example, one or more applications in the application whitelist may be applications that are customized by the user and for which the video note application is expected to support recording, and one or more views in the view whitelist may be views that are customized by the user and for which the video note application is expected to support recording.

In this way, application identification information and view identification information of an expected record area are preset based on the application whitelist and the view whitelist, and a target record area is determined based on the application whitelist, the view whitelist, and information about a window currently displayed on the display screen, instead of performing full-screen recording blindly, and the user does not need to perform tapping/clicking or dragging manually to define a record area. Therefore, the problem of an excessively large data volume of recorded screen data caused by performing full-screen recording blindly can be alleviated, the problem of user operation costs of the screen area recording function can be alleviated, and different screen recording requirements of the user in a plurality of different scenarios can be met. For example, when a displayed page includes a video playing area, a screen recording requirement of the user for recording the video playing area is met. When a displayed page does not include a video playing area, but includes an interface of an application expected to be recorded, the entire interface of the application is recorded, which meets a screen area recording requirement in a split-screen scenario. Moreover, when a displayed page includes neither a video playing area nor an interface of an application expected to be recorded, all display content in a display area corresponding to the display screen is recorded, which meets a full-screen recording requirement.

In this application, the displaying a first interface of the first application may be understood as that the display screen currently displays only the first interface of the first application, or may be understood as that the display screen currently displays only the first interface and the interface of the video note application. The displaying a second interface of the first application may be understood as that the display screen currently displays only the second interface and the interface (including content such as the function bar and a video note document) of the video note application. In this application, the displaying the second interface and an interface of a second application in a split-screen display manner may be understood as that the display screen currently displays, but is not limited to, the second interface and the interface of the second application, for example, may further display an interface of one or more other applications that are not included in the application whitelist. The displaying the interface of the second application and an interface of a third application in a split-screen display manner may be understood as that the display screen currently displays, but is not limited to, the interface of the second application and the interface of the third application, for example, may further display an interface of one or more other applications that are not included in the application whitelist.

In a possible implementation, if the first interface of the first application displayed on the display screen further includes a third area before the electronic device receives the first tap/click operation through the video note application, where a view identifier corresponding to the third area is included in the view whitelist, the recording, by using the video note application, display content corresponding to the first area may specifically include: recording display content in a minimum rectangular area that is on the display screen and that includes the first area and the third area.

In a possible implementation, after the displaying the function bar, and before the recording, by using the video note application, display content corresponding to the first area, the method further includes: obtaining a first window information set, where the first window information set is a set of window information of at least one window displayed on the display screen, and the first window information set includes window information of the first interface; obtaining a first set based on the first window information set and the application whitelist, where each application in the first set is included in the first window information set and included in the application whitelist, and the first set includes the first application; and obtaining size information of a target view based on the first set, the view whitelist, and the first window information set, and determining that size information of a target record area is the size information of the target view, where the target view is a view that is in the view whitelist and that is corresponding to the first application, and the target view is the view corresponding to the first area. The recording, by using the video note application, display content corresponding to the first area includes: recording, based on the size information of the target view recorded by the target record area, the display content corresponding to the first area.

Specifically, in response to the user operation of calling up the function bar of the video note application, the video note application enables an accessibility service, and continuously detects a window status based on the accessibility service. After a window state change triggered by the user operation of calling up the function bar of the video note application is detected based on the accessibility service, the first window information set is obtained.

For example, an identifier corresponding to each element in the first set is a package name of an application. View identifiers recorded in the view whitelist are in one-to-one correspondence with application identifiers recorded in the application whitelist.

Optionally, the obtaining size information of a target view based on the first set, the view whitelist, and the first window information set, and determining that size information of a target record area is the size information of the target view may be specifically: obtaining size information of a reference view based on the first window information set sequentially according to an address of an element in the first set, and determining whether the obtained size information of the reference view is a valid value, where the reference view is a view that is in the view whitelist and that is corresponding to a reference application, and the reference application is an application that is in the first set and that is corresponding to the address of the element; and determining, if the size information of the target view is obtained and an element address of the first application in the first set is greater than an element address of any target application, that the size information of the target record area is the size information of the target view, where the target application is included in the first set, size information of a view corresponding to the target application is a valid value, and the target application is not the first application.

To be specific, the size information of the target record area is size information corresponding to the last view id whose size information (or the size information is referred to as a valid value) can be obtained in M view ids. The M view ids are views that are in the view whitelist and that are respectively corresponding to M application package names in an application package name set. For details, refer to detailed descriptions of related method steps in FIG. 8B, which are not described herein.

For example, if the size information of the reference view is obtained, it may also be understood that the size information of the reference view is a valid value. In this case, it is determined that the size information of the target record area is the size information of the reference view, and size information of a reference view of a reference application corresponding to a next element address in the first set is obtained sequentially through traversal. When it is determined that the size information of the reference view is a valid value, it is determined that the size information of the target record area is the size information of the current reference view. If the size information of the reference view cannot be obtained, the traversal continues to obtain size information of a reference view of a reference application corresponding to a next element address until the address of the element is the last address in the first set.

Alternatively, the obtaining size information of a target view based on the first set, the view whitelist, and the first window information set, and determining that size information of a target record area is the size information of the target view may be specifically: determining a first view set based on the first set and the view whitelist, where each view in the first view set is included in the view whitelist, an application corresponding to each view in the first view set is included in the first set, and the first view set includes a first view corresponding to the first area; determining a second view set, where the second view set is a set of target views, and the target view is an element whose size information is a valid value in the first view set; and when the second view set includes only the first view, determining that the size information of the target record area is size information corresponding to the first view; or when the second view set includes the first view, and the first view is the first element or the last element in the second view set, determining that the size information of the target record area is size information of the first view. For details, refer to detailed descriptions of related method steps in FIG. 8A, which are not described herein.

In a possible implementation, after the displaying a second interface of the first application, and before the recording display content of an entire interface of the second interface by using the video note application, the method further includes: obtaining a second window information set, where the second window information set is a set of window information of at least one window displayed on the display screen, and the second window information set includes window information of the second interface; obtaining a second set based on the second window information set and the application whitelist, where each application in the second set is included in the second window information set and included in the application whitelist, and the second set includes the first application; and determining, if size information corresponding to an identifier of a target view fails to be obtained based on the second set, the view whitelist, and the second window information set, that size information of a target record area is size information of an entire display area of the second interface, where the target view is a view that is in the view whitelist and that is corresponding to the first application. The recording display content of an entire interface of the second interface by using the video note application includes: recording the display content of the entire interface of the second interface based on the size information of the entire display area of the second interface recorded by the target record area.

For example, the second user operation may be specifically a series of corresponding operation instructions for instructing to display the second interface and the interface of the second application in a split-screen display manner.

Specifically, after the video note application detects, based on the accessibility service, a window state change triggered by displaying the second interface and the interface of the second application in a split-screen display manner, the second window information set is obtained.

Optionally, the determining, if size information corresponding to an identifier of a target view fails to be obtained based on the second set, the view whitelist, and the second window information set, that size information of a target record area is size information of an entire display area of the second interface, where the target view is a view that is in the view whitelist and that is corresponding to the first application includes: obtaining size information of a reference view based on the second window information set according to an address of an element in the second set, where the reference view is a view that is in the view whitelist and that is corresponding to a reference application, and the reference application is an application that is in the first set and that is corresponding to the address of the element; and determining, if the size information of the reference view fails to be obtained, that the size information of the target record area is the size information of the entire display area of the second interface. For details, refer to detailed descriptions of related method steps in FIG. 8B, which are not described herein.

To be specific, if valid size information cannot be obtained by traversing size information of a view corresponding to each application in the second set, it is determined, based on the first application and the application whitelist, that the size information of the target record area is the size information of the entire display area of the second interface.

Optionally, a third view set is determined based on the second set and the view whitelist, where each view in the first view set is included in the view whitelist, and an application corresponding to each view in the third view set is included in the second set; and it is determined, based on that the second set includes only the first application, the third view set includes no view corresponding to an area in the second interface and no view corresponding to an area of the interface of the second application, that the size information of the target record area is second size information corresponding to the entire display area of the second interface.

In a possible implementation, each element in the application whitelist is identification information of an application including a video playing function, and each element in the view whitelist is identification information of a view configured to play video data.

According to a second aspect, this application provides a screen recording method. The method includes: starting a video note application, and in response to a user operation of calling up a function bar of the video note application, displaying the function bar including a start recording button; displaying a target interface based on a user operation; and when the target interface includes a video playing area, in response to a first tap/click operation on the start recording button, recording display content corresponding to the video playing area in the target interface; or when the target interface does not include a video playing area, and an application corresponding to the target interface is an application that supports video playing, in response to a second tap/click operation on the start recording button, recording display content of an entire interface of the target interface; or when the target interface does not include a video playing area, and the application corresponding to the target interface is not an application that supports video playing, in response to a tap/click operation on the start recording button, recording display content in an entire display area of a display screen.

Specifically, in response to a tap/click operation on the start recording button, display content in an area corresponding to size information of a target record area is recorded. The target record area is determined in the following manner: in response to a window state change of the display screen, obtaining a window information set of a current window; and after obtaining the window information set of the current window, determining the target record area based on the window information set, which specifically includes: obtaining a target set based on the window information set and an application whitelist, where each application in the target set is included in the window information set and included in the application whitelist; obtaining, based on the target set, a target view in the view whitelist and corresponding to a reference application (the reference application is any element in the target set); and when determining that size information corresponding to the target view is obtained, determining that the size information of the target record area is the size information corresponding to the target view. When it is determined that size information of a target view corresponding to each reference application in the target set cannot be obtained and the target set includes a target application, it is determined that the size information of the target record area is size information corresponding to an interface of the target application. Alternatively, when a quantity of elements in the target set is 0, it is determined that the size information of the target record area is size information of the entire display area of the display screen. For example, when the function bar including the start recording button is displayed, a window state change occurs on the display screen, which triggers the obtaining a window information set of a current window, and the determining the target record area based on the window information set.

For example, when the target interface is displayed, a window state change occurs on the display screen, which triggers the obtaining a window information set of a current window, and the determining the target record area based on the window information set. For example, the displaying a target interface may be the "displaying a first interface of the first application" described in the first aspect, the "displaying a second interface of the first application" described in the first aspect, the "displaying the second interface and an interface of a second application" described in the first aspect, or the "displaying the interface of the second application and an interface of a third application" described in the first aspect.

For explanations of names such as the application whitelist, the view whitelist, the window information set, and the target record area, refer to related descriptions of the first aspect. Details are not described herein again.

According to the method provided in this embodiment of this application, a record area is determined based on specific content of a current display interface of the display screen, instead of performing full-screen recording blindly, and a user does not need to perform tapping/clicking or dragging manually to define a record area. In this way, a problem of an excessively large data volume of recorded screen data caused by performing full-screen recording blindly can be alleviated, and a problem of user operation costs of a screen area recording function can be alleviated.

In addition, different screen recording requirements of the user in a plurality of different scenarios can be met. For example, when the displayed target interface includes a video playing area, display content in the video playing area is recorded, which meets a screen area recording requirement in a video playing scenario. When the displayed target interface does not include a video playing area, but the displayed target interface is an interface of an application expected to be recorded, an entire interface of the target interface is recorded, which meets a screen area recording requirement in a split-screen scenario. Moreover, when the displayed target interface includes neither a video playing area nor an interface of an application expected to be recorded, all display content in a display area corresponding to the display screen is recorded, which meets a full-screen recording requirement.

According to a third aspect, an embodiment of this application provides an electronic device. The electronic device includes: one or more processors, a memory, and a display screen. The memory is coupled to the one or more processors, the memory is configured to store computer program code, the computer program code includes computer instructions, and the one or more processors invoke the computer instructions to enable the electronic device to perform the method according to the first aspect or any possible implementation of the first aspect or the second aspect or any possible implementation of the second aspect.

According to a fourth aspect, an embodiment of this application provides a chip system. The chip system is used in an electronic device, the chip system includes one or more processors, and the processor is configured to invoke computer instructions to enable the electronic device to perform the method according to the first aspect or any possible implementation of the first aspect or the second aspect or any possible implementation of the second aspect.

According to a fifth aspect, an embodiment of this application provides a computer program product including instructions. When the computer program product is run on an electronic device, the electronic device is enabled to perform the method according to the first aspect or any possible implementation of the first aspect or the second aspect or any possible implementation of the second aspect.

According to a sixth aspect, an embodiment of this application provides a computer-readable storage medium, including instructions. When the instructions are run on an electronic device, the electronic device is enabled to perform the method according to the first aspect or any possible implementation of the first aspect or the second aspect or any possible implementation of the second aspect.

It may be understood that, the electronic device provided in the third aspect, the chip provided in the fourth aspect, the computer program product provided in the fifth aspect, and the computer storage medium provided in the sixth aspect are all configured to perform the method provided in embodiments of this application. Therefore, for beneficial effects that can be achieved by them, refer to the beneficial effects in the corresponding method. Details are not described herein again.

DESCRIPTION OF EMBODIMENTS

Figure 1:
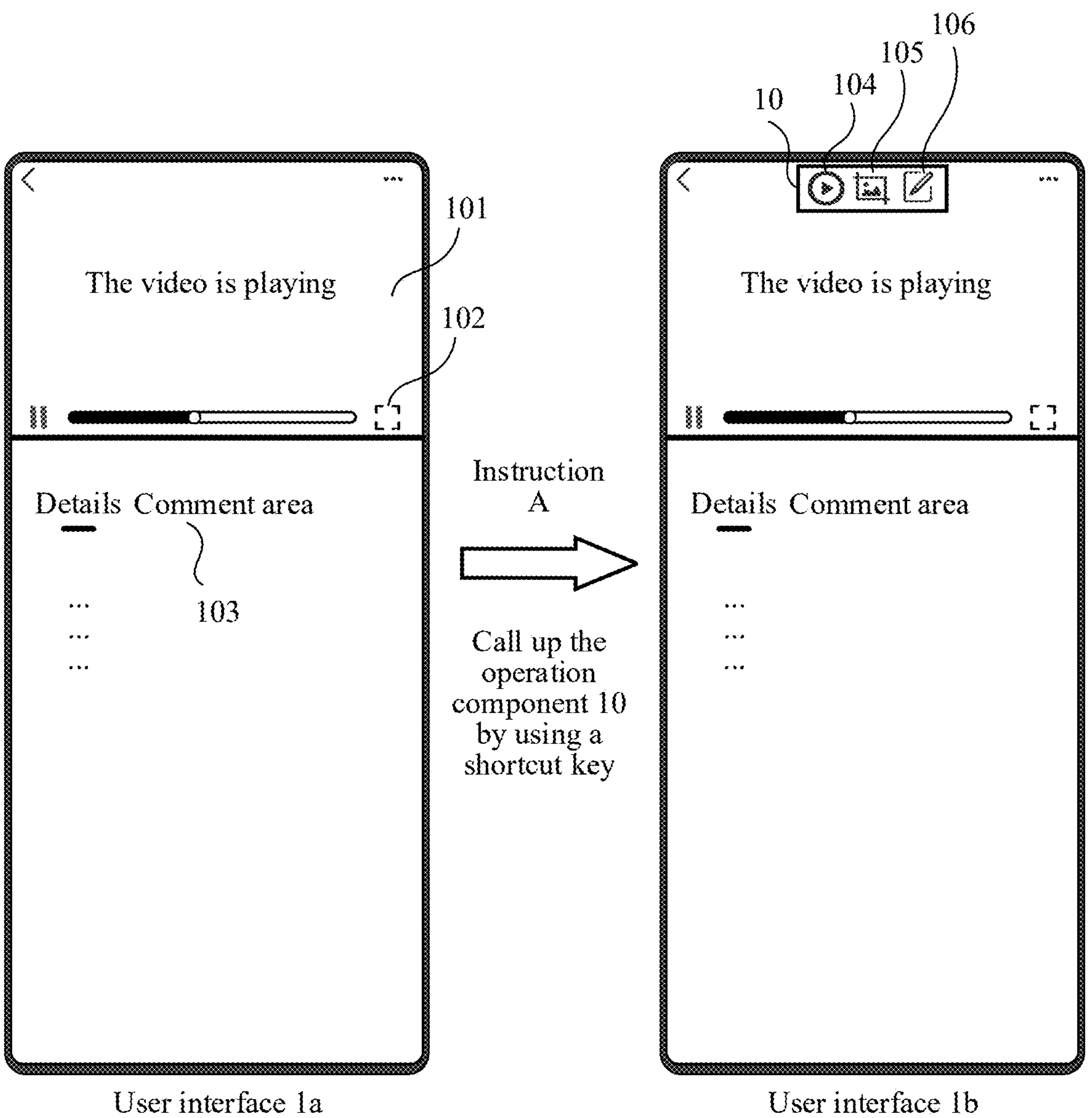
FIG. 1 is a user interface diagram of calling up a screen recording related function bar in a video note application according to an embodiment of this application.

To make objectives, technical solutions, and advantages of this application clearer, the following further describes this application in detail with reference to accompanying drawings.

In the specification, claims, and accompanying drawings of this application, the terms "first", "second", and the like are merely intended to distinguish between different objects, rather than indicate a specific order. In addition, the terms "include", "have", and any variant thereof are intended to cover a non-exclusive inclusion. For example, processes, methods, systems, products, or devices including a series of steps or units are not limited to steps or units listed, but optionally further include steps or units that are not listed, or optionally further include other steps or units inherent to these processes, methods, products, or devices.

Reference to "embodiment" in the specification means that specific features, structures, or characteristics described with reference to the embodiment may be included in at least one embodiment of this application. The phrase shown at various positions in the specification may not necessarily refer to a same embodiment, nor an independent or optional embodiment exclusive from another embodiment. Persons skilled in the art may explicitly or implicitly understand that embodiments described in the specification may be combined with other embodiments.

In this application, "at least one (item)" means one or more, "a plurality of" means two or more, "at least two (items)" means two, three, or more, and "and/or" is used to describe an association relationship between associated objects, and indicates that there may be three relationships. For example, "A and/or B" may indicate three cases: only A exists, only B exists, and both A and B exist, where A and B may be singular or plural. The character "/" generally indicates an "or" relationship between the associated objects. The expression "at least one of the following items (pieces)" or a similar expression thereof means any combination of these items. For example, at least one item (piece) of a, b, or c may represent a, b, c, "a and b", "a and c", "b and c", or "a, b, and c".

For ease of understanding, some concepts related to embodiments of this application are described for reference by using examples.

(1) Video Note Application

In this application, the video note application supports screen recording, and a video file obtained through screen recording may be recorded into a corresponding note document. In addition to the screen recording function, the video note application may further support text and/or image recording in a note document. This is not limited herein. In this application, the video note application may be a separate application (application, app), or may be a function integrated in a note application (for example, a memo application). This is not limited herein.

(2) View (View)

The view (view) is a class (or referred to as an object) in interface programming design, and represents a basic construction module of a user interface. One view corresponds to one rectangular area on a display screen. The rectangular area may be configured for interface drawing and processing of an event, for example, a touch event, and is a basic class for constructing a user interface component (for example, a button Button or a text field Textfield).

For example, a text, a control, an image, and a media stream (for example, a video stream) may each correspond to one independent view, namely, a text view (textview), a button view (button), and an image view (imageview). For example, as shown in a user interface 1*a* in FIG. 1, a video playing area 101 may correspond to one independent view, a video zoom-in-to-full-screen icon 102 may correspond to one independent view, and a display area corresponding to a "comment area" in a comment area 103 may correspond to one independent view.

It may be understood that, it is determined during user interface design that different areas are defined on the display screen by using different views to display corresponding content. For example, during project development, a corresponding view area is designed to display an element such as a text, a control, or an image. Each view has a corresponding view identifier (view id) for identifying the view. In user interface design, content expected to be displayed in the view may be edited based on the view id.

Generally, one view may correspond to a single text, control, or image, or one view may correspond to a view group including a plurality of texts, and/or controls, and/or images. This is not limited herein.

Generally, a display area corresponding to one view is in a shape of a rectangle, and size information of one view (that is, one rectangular display area) includes coordinates of an upper left corner, a width, and a height. It may be understood that, depending on a change of a platform service, a shape of the display area corresponding to one view may not be limited to the rectangle, and may be another shape such as a circle. This is not limited herein.

(3) Accessibility Service

The accessibility service is a function provided to assist a specific group of people having an accessibility function requirement. For example, the accessibility service may include one or more of screen reading, select-to-speak, and a braille keyboard.

The accessibility service can receive some events (AccessibilityEvent) sent by a window management service (WindowManageService). These events are state changes related to display content in a window, such as a button tap/click, an input box content change, and a focus change. Specifically, after the accessibility service in an electronic device is enabled, when the window management service detects a window state change (window state change), the window management service may send an AccessibilityEvent event to the accessibility service through an AccessibilityEvent callback function. In this application, sending messages between modules (for example, the window management service and the accessibility service) means that the modules obtain data through function invocation, or transfer data through inter-process communication.

The window state change may be an operation such as tapping/clicking, dragging, or updating on any view displayed on the display screen. Generally, after receiving AccessibilityEvent, the accessibility service may obtain current window information of the display screen, to provide the accessibility service to the user based on the window information.

The foregoing descriptions of the concepts may apply to the following embodiments.

Advantages of a screen recording method provided in an embodiment of this application are described below in detail with reference to other screen recording methods.

In some other screen recording methods, when the electronic device performs screen recording, an entire display area of the display screen is recorded by default, which leads to a large probability that recorded screen data obtained through recording includes a picture that the user does not want to record, and results in that the recorded screen data has a large data volume and causes storage pressure to the electronic device. Alternatively, a picture range of video data may be edited by using some video editing software to retain content in a specific area of a video. However, the video editing software has a high requirement on mobile phone performance and high operation difficulty, which is not suitable for large-scale use.

In view of this, an embodiment of this application provides a method of choosing, based on specific content currently displayed on the display screen, whether to perform screen area recording or full-screen recording, to alleviate the problems of a large probability that recorded screen data obtained through recording includes a picture that the user does not want to record, and a large data volume of the recorded screen data.

For example, according to the screen recording method provided in this embodiment of this application, an application whitelist and a view whitelist may be preset in the electronic device. The application whitelist is used to record a preset application that supports recording of the video note application. The application whitelist may include an identifier of the application that supports recording of the video note application. The view whitelist includes a view corresponding to a preset record area of each application in the application whitelist. The view whitelist includes an identifier (view id) of the view corresponding to the preset record area. Optionally, a separate view whitelist may be set for each application in the application whitelist. For example, a view whitelist of a target application may record a view corresponding to a preset record area in each interface of the target application. One application may include a plurality of interfaces. After the video note application is started, a window status is continuously detected based on the accessibility service. After a window state change is detected, a window information set is obtained based on the accessibility service. Moreover, if it is determined, based on the window information set, the application whitelist, and the view whitelist, that there is a target view in views currently displayed on the display screen, the target view comes from an application in the application whitelist, and an identifier of the target view is included in the view whitelist, the electronic device determines to record, by using the video note application, an area corresponding to the target view. If it is determined that there is not a target view but a target window, and the target window comes from an application in the application whitelist, the electronic device records the target window by using the video note application. If it is determined that there is neither a target window nor a target view, the electronic device performs full-screen recording by using the video note application.

Generally, when the user performs screen recording by using third-party screen recording software, if a recording requirement of the user is a video that is playing, a record area expected by the user is a playing area of the video, while a record area not expected by the user is an area other than the playing area of the video. For example, as shown in a user interface 1*c* in FIG. 2, if the recording requirement of the user is a video that is playing, the record area expected by the user is a video playing area 201, and the record area not expected by the user is an area other than the video playing area 201, for example, a detail description area, a comment area, or other areas. If the recording requirement of the user is not a played video picture, the record area expected by the user is an entire window corresponding to an application, or the record area expected by the user is the entire display area of the display screen.

For example, in this embodiment of this application, the application whitelist and the view whitelist that are stored in the electronic device by using the video note application may be determined depending on a specific requirement. For example, each application identifier in the application whitelist is an identifier of an application including a video playing function, and each view identifier in the view whitelist is an identifier of a view that is in an application including a video playing function and that is corresponding to a video picture playing area.

Based on this, in some scenarios, when the display screen of the electronic device currently displays a video playing area (a target view) that comes from the application whitelist and whose view identifier is included in the view whitelist, if a start screen recording instruction is received, the electronic device records the video playing area by using the video note application. This effectively alleviates the problems of a large probability that recorded screen data obtained through recording includes a picture that the user does not want to record, and a large data volume of the recorded screen data.

In some scenarios, when the display screen of the electronic device currently displays a non-video-playing application interface (a target window) that comes from the application whitelist and whose view identifier is not included in the view whitelist, if a start screen recording instruction is received, the electronic device records the target window by using the video note application. In addition, in some scenarios, when an application interface currently displayed on the display screen of the electronic device is a non-video-playing interface, and the application interface does not come from the application whitelist, if a start screen recording instruction is received, the electronic device records the entire display area of the display screen by using the video note application. This effectively alleviates the problems of a large probability that recorded screen data obtained through recording includes a picture that the user does not want to record, and a large data volume of the recorded screen data, and further meets different screen recording requirements of the user in different scenarios.

In some other screen recording methods, the electronic device supports a screen area recording function, which is specifically recording a display area selected by the user autonomously through tapping/clicking and dragging. Such methods incur high user operation costs. For example, high time costs are spent defining a record area through tapping/clicking and dragging. In addition, in most of the area recording methods, recorded screen data is generated by splicing an area screenshot and a screenshot picture. During screen recording, a large volume of area screenshot data is generated, which needs to occupy a large internal memory space, resulting in a high performance requirement on the electronic device.

According to the method provided in this embodiment of this application, the electronic device determines a record area based on a current window information set, the pre-stored application whitelist and view whitelist, and the accessibility service by using the video note application, instead of performing screen area recording based on an area defined by the user through tapping/clicking and dragging, thereby reducing user operation costs while meeting a screen area recording function of the user.

In addition, after determining the record area, the electronic device obtains recorded screen data through screen recording by using the video note application, instead of generating recorded screen data by splicing an area screenshot and a screenshot picture, thereby alleviating the problems of a large internal memory space occupied by a screen recording process and a high performance requirement on the electronic device.

The screen recording method provided in this embodiment of this application is described below in detail with reference to user interfaces provided in this embodiment of this application.

In this embodiment of this application, the video note application is installed in the electronic device, and the electronic device provides the user with a function of calling up, through a preset shortcut key, a screen recording related function bar corresponding to the video note application. The shortcut key may be a combination of one or more virtual buttons and/or physical buttons, which is not limited herein. Application of the screen recording method provided in this application is described below with reference to several scenarios.

Scenario 1:

Refer to FIG. 1. The electronic device is a mobile phone terminal. The electronic device runs a first application. For example, the first application is a video application. The electronic device displays a first interface of the first application on the display screen in a full-screen display manner. For example, the first interface is a page in which the first application plays a video, as shown in the user interface 1*a* in FIG. 1. In response to a shortcut key operation of calling up a function bar (in this application, the function bar is a function bar corresponding to the video note application), the electronic device displays a function bar 10 shown in a user interface 1*b* in FIG. 1. The function bar 10 includes a start screen recording icon 104. In some other possible implementations, the function bar 10 may further include a screenshot icon 105 and/or an edit icon 106. The function bar 10 may also be understood as a tool bar or a floating bar. It may be understood that in background implementation of the electronic device, the function bar 10 may be displayed by invoking a control or a component.

Optionally, that the electronic device displays the function bar 10 in the user interface 1*b* in response to the shortcut key operation of calling up the function bar may be specifically as follows: Before the electronic device starts and runs the video note application (which may also be understood as that no page corresponding to the video note application is displayed in any image layer on the display screen), in response to an operation on the shortcut key, the electronic device starts the video note application and displays the function bar 10 on the display screen. Alternatively, the electronic device has run the video note application in background. For example, the electronic device starts and runs the video note application based on a tap/click operation on an application icon of the video note application, but after starting and running the video note application, the electronic device starts and runs the first application, and displays a page of the first application in an uppermost layer. When running the video note application and the first application, the electronic device calls up the function bar 10 in response to an operation on the shortcut key.

Figure 7:
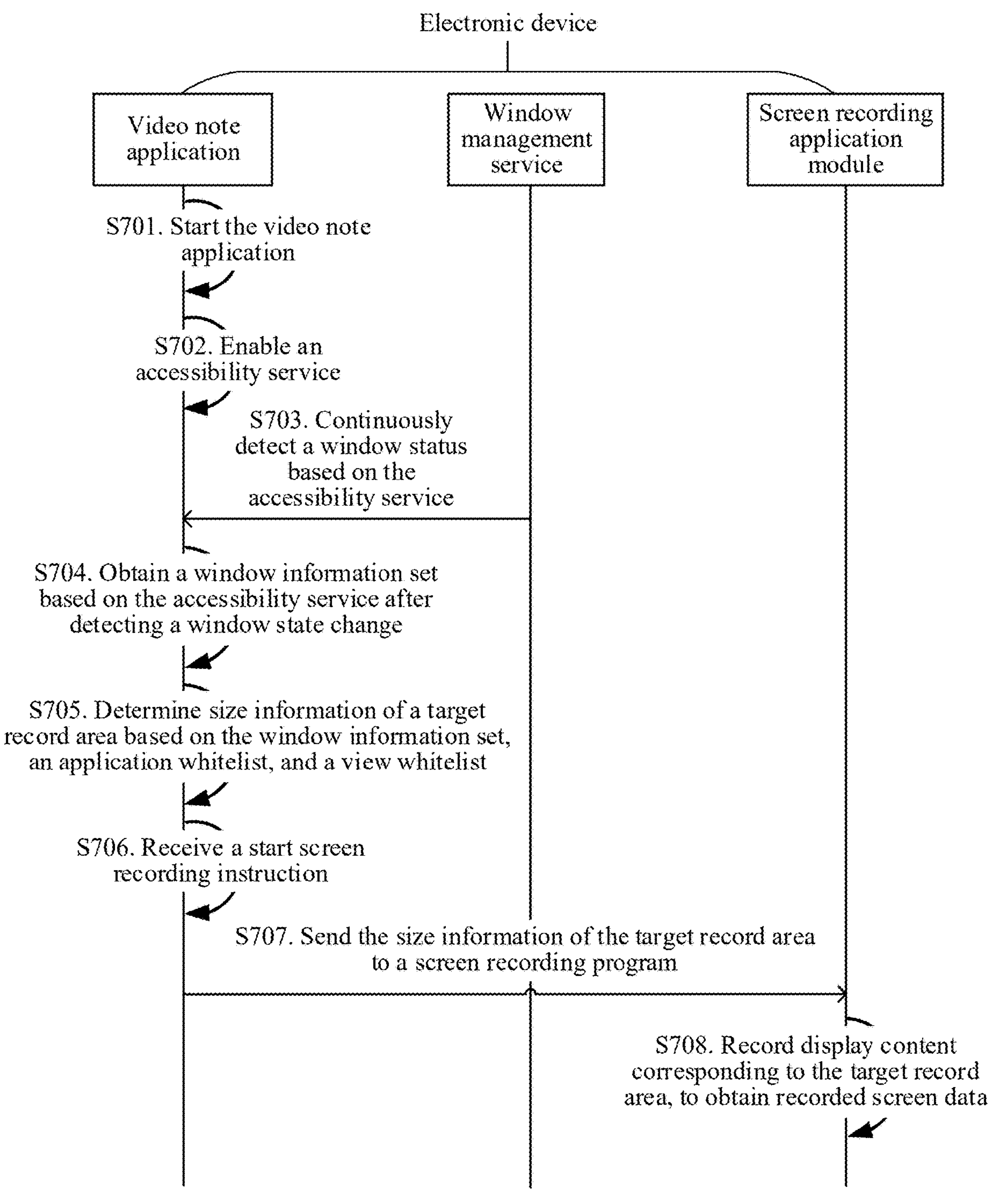
FIG. 7 is a timing flowchart of a screen recording method according to an embodiment of this application.

For example, that the electronic device displays the function bar 10 in response to the shortcut key operation of calling up the function bar specifically includes steps S701 to S705 shown in FIG. 7.

S701. Start the video note application.

It may be understood that after receiving the shortcut key operation for the function bar corresponding to the video note application, the electronic device starts and runs the video note application, and displays the function bar 10 on the display screen.

Figure 13:
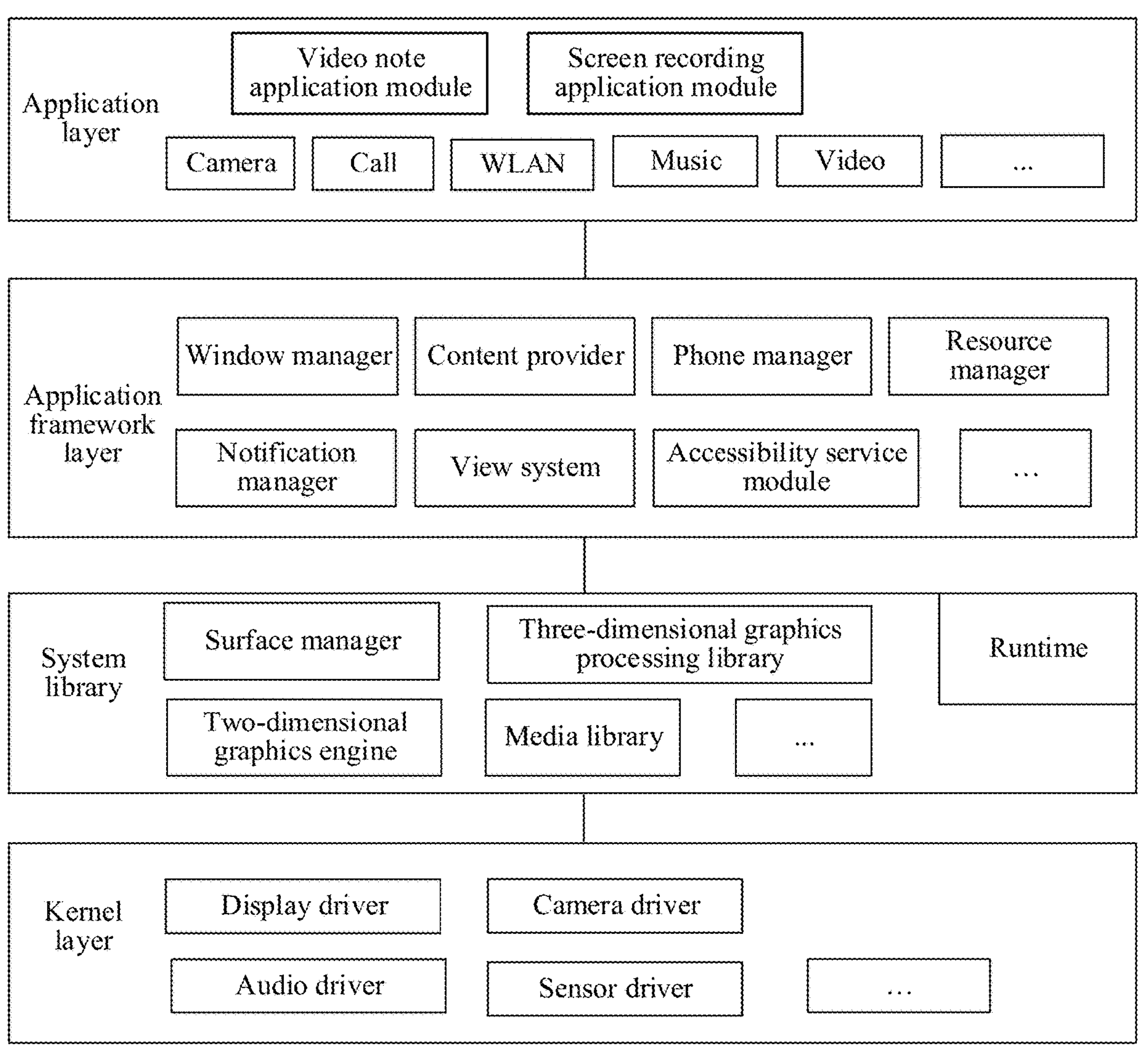
FIG. 13 is a block diagram of a software structure of the electronic device 100 according to an embodiment of this application.

In this embodiment of this application, corresponding to a software framework diagram shown in FIG. 13, the video note application belongs to an application layer.

S702. The video note application enables the accessibility service.

For example, an enabling function enableAccessibility-Services( ) of the accessibility service is provided in a Google native service. The video note application may enable a system function of an accessibility service module in the electronic device by invoking the enabling function enableAccessibilityServices( ) The accessibility service module in the electronic device actively enables the accessibility service after receiving the invocation of the enabling function enableAccessibilityServices( ).

Optionally, after the video note application is started, regardless of whether the accessibility service module is currently enabled, the video note application invokes the enabling function to enable the accessibility service.

Alternatively, after the video note application is started, when it is determined that the accessibility service module is currently not enabled, the enabling function is invoked to enable the accessibility service. For example, that the video note application enables the accessibility service specifically includes: After the video note application is started, it is determined whether the accessibility service module is currently enabled. For example, an object of an accessibility service management class (AccessibilityManager) may be instantiated, and an is Enabled( ) method is invoked based on the instantiated object of AccessibilityManager to determine whether the accessibility service module is currently enabled. If the accessibility service module is currently not enabled, the enabling function is invoked to enable the accessibility service. If the accessibility service module is currently enabled, the video note application does not invoke the enabling function to enable the accessibility service, that is, step S702 is not performed, and step S703 is directly performed.

It may be understood that, after the accessibility service module receives an invocation request for the enabling function, if it is determined that the accessibility service module is currently not enabled, the accessibility service module is enabled. If it is determined that the accessibility service module is currently enabled, the enabled state may be maintained unchanged. A specific enabling method for the accessibility service module depends on specific design of the Google native service, and is not limited herein.

For example, the enabling the accessibility service module is specifically enabling a system capability of an accessibility service class (AccessibilityService class) in the accessibility service module. The system capability of the AccessibilityService class includes: receiving an event AccessibilityEvent that is sent by the window management service and that indicates a window state change (window state change). In addition, after AccessibilityEvent is received, window information AccessibilityWindowInfo related to AccessibilityEvent may be obtained based on a getwindows( ) method, and view information AccessibilityNoteInfo in a window related to AccessibilityEvent may be obtained based on an Accessibility WindowInfo.getRoot ( ) method.

In some other possible implementations, the electronic device may alternatively perform the foregoing step S702 (that is, enable the accessibility service) after starting the video note application and receiving the shortcut key operation. To be specific, the electronic device enables the accessibility service after receiving an instruction of the shortcut key operation, and does not enable the accessibility service when the video note application is started but the shortcut key operation is not received.

S703. The video note application continuously detects a window status based on the accessibility service.

It should be noted that, the video note application detects the window status by using the accessibility service. Optionally, if a window state change occurs, the system performs feedback to the video note application through the accessibility service. In this way, the window status is detected. In some implementations, it may also be understood that the window status is continuously detected. For example, the video note application inherits from the AccessibilityService class. To be specific, the AccessibilityService class is used as a parent class, an AccessibilityService child class is created, and the Accessibility Service child class has the same system capability as the Accessibility Service parent class. For example, if the Accessibility Service child class receives AccessibilityEvent sent by the window management service, it indicates a window state change (window state change). Alternatively, if the AccessibilityService child class detects that the AccessibilityEvent callback function is invoked, it indicates a window state change. This is not limited herein. In this application, after the accessibility service is enabled, the accessibility service child class performs a task of continuously detecting a window status.

In this embodiment of this application, corresponding to the software framework diagram shown in FIG. 13, the window management service belongs to a window management module in an application framework layer.

S704. The video note application obtains a window information set based on the accessibility service after detecting a window state change.

For example, after S701, the electronic device displays, after receiving a tap/click operation on the comment area 103, an interface corresponding to the comment area 103. The tap/click operation on the comment area 103 is a tap/click operation on a view, that is, belongs to a type of window state change (window state change). Therefore, the accessibility service child class in the video note application can detect the window state change corresponding to the tap/click operation on the comment area 103, thereby triggering the foregoing step S704 to be performed to obtain a window information set of a current window.

For example, after the video note application is started, the accessibility service is enabled, and the accessibility service child class may detect the window status. Because the video note application displaying, in response to the shortcut key operation, the function bar 10 in the user interface 1*b* shown in FIG. 1 belongs to a type of window state change (a specific change is that a view area corresponding to the function bar 10 is added to the interface), the accessibility service child class can detect the window state change about displaying the function bar 10, thereby triggering the foregoing step S704 to be performed to obtain a window information set of a current window.

In this embodiment of this application, after the window state change, the video note application may obtain, based on the getWindows( ) method, window information Accessibility WindowInfo related to AccessibilityEvent, and may obtain, based on the .getRoot( ) method, view information AccessibilityNoteInfo included in AccessibilityWindow-Info.

In this embodiment of this application, the window information set is a set of window information of one or more windows displayed on the display screen, and each element in the window information set is window information corresponding to one window displayed on the display screen. For example, the window information set may be an array of a list (List) type. Window information of a window includes an application package name and information about one or more views, the view displayed in the window comes from an application corresponding to the application package name, and information about each view includes at least size information corresponding to a view id (view id) of the view.

S705. The video note module determines size information of a target record area based on the window information set, the application whitelist, and the view whitelist.

In this embodiment of this application, the application whitelist is a list that is preset in the video note application and that is used to record a package name of an application for which the video note application supports recording. The view whitelist is a list preset in the video note application and used to record a view id of a view that is corresponding to the application in the application whitelist and for which the video note application supports recording.

For example, each application package name in the application whitelist is an identifier of an application including a video playing function, and each view identifier in the view whitelist is a view id of a view that is in the application including a video playing function and that is corresponding to a video picture playing area. Optionally, the video note application may further provide the user with a function of customizing data items included in the application whitelist and the view whitelist. This is not limited herein.

It may be understood that the package name of the application is public information, and the package name of the application can be obtained from an official website of software. A view id of a view of a related interface in the application may or may not be public. If the view id is not public, the view whitelist may be obtained based on communication, authorization, or the like.

For example, a first association relationship between the application whitelist and the view whitelist is shown in the following Table 1. Identification information of applications for which the video note application supports recording include an application package name A, an application package name B, and an application package name C, identification information of views that are corresponding to the application package name A and for which the video note application supports recording include a view id a1 and a view id a2, identification information of a view that is corresponding to the application package name B and for which the video note application supports recording includes a view id b1, and identification information of views that are corresponding to the application package name C and for which the video note application supports recording include a view id c1 and a view id c2.

TABLE 1

| Application whitelist | View whitelist |
|---|---|
| Application package name A | View id a1 |
| | View id a2 |
| Application package name B | View id b1 |
| Application package name C | View id c1 |
| | View id c2 |
| . . . | . . . |

For ease of description, any application package name in the application whitelist is collectively referred to as a reference application package name below. In this embodiment of this application, there may be one or more view ids in the view whitelist and corresponding to the reference application package name. This is not limited herein.

Figure 8A:
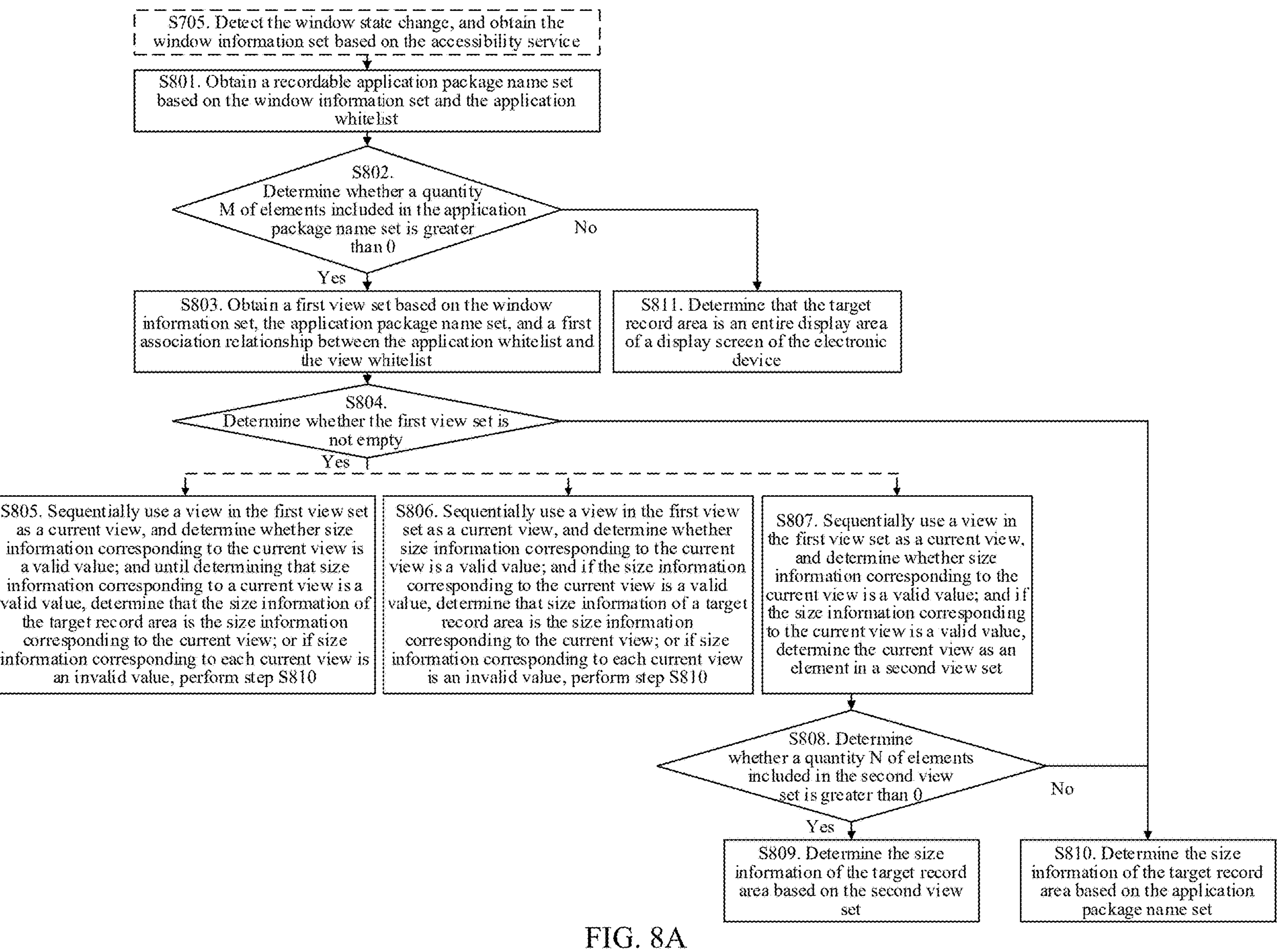
FIG. 8A is a method flowchart of a specific implementation of step S706 in FIG. 7 according to an embodiment of this application.

A specific implementation of step S706 is described below in detail with reference to FIG. 8A. As shown in FIG. 8A, that the video note module determines size information of a target record area based on the window information set, the application whitelist, and the view whitelist specifically includes:

S801. Obtain a recordable application package name set based on the window information set and the application whitelist.

In this embodiment of this application, each element in the application package name set is an application package name included in both the window information set and the application whitelist.

For example, S801 specifically includes: obtaining view information AccessibilityNoteInfo of each piece of window information in the window information set based on the .getRoot( ) method. For example, for ease of description, AccessibilityNoteInfo corresponding to each piece of window information in the window information set is collectively referred to as a root below. A .getPackageName( ) method is invoked by using the root to obtain an application package name 1 included in the root, where the application package name 1 is an application package name included in window information corresponding to the root. Then, it is determined whether the application package name 1 is included in the application whitelist. If the application package name 1 is included in the application whitelist, the application package name 1 is used as an element in the application package name set. If the application package name 1 is not included in the application whitelist, the application package name 1 is not used as an element in the application package name set. In this way, the application package name set can be obtained.

S802. Determine whether a quantity M of elements included in the application package name set is greater than 0.

If M is greater than 0, the video note module performs step S803. If M is equal to 0, the video note module performs step S811.

In this embodiment of this application, if M is greater than 0, step S803 is performed. If M is equal to 0, step S811 is performed.

S803. Obtain a first view set based on the window information set, the application package name set, and the first association relationship between the application whitelist and the view whitelist.

Each element in the first view set is a view identifier, each view identifier in the first view set is included in the view whitelist, and an application package name corresponding to the view identifier is included in the application package name set.

For ease of description, each element in the application package name set is referred to as a reference application package name below.

For example, S803 specifically includes: sequentially obtaining, based on the first association relationship, one or more view ids in the view whitelist and corresponding to each reference application package name, and using the one or more obtained view ids as the first view set. For example, the application package name set includes the application package name A and the application package name B. In this case, view ids in the view whitelist and corresponding to the application package name A are obtained, specifically including the view id a1 and the view id a2, and a view id in the view whitelist and corresponding to the application package name B is obtained, specifically including the view id b1, to obtain the first view set, including the view id a1, the view id a2, and the view id b1.

S804. Determine whether the first view set is not empty.

For example, the determining whether the first view set is not empty is specifically determining whether a quantity of elements corresponding to the first view set is greater than 0. If the quantity is greater than 0, the first view set is not empty. If the quantity is 0, the first view set is empty.

Alternatively, for example, the determining whether the first view set is not empty may be specifically determining whether there is an element whose value is a valid value, or in other words, an element whose value is not an invalid value (for example, the invalid value is null or undefined) but size information for indicating an area of a view, in the first view set. If there is such an element, the first view set is not empty. If there is no such an element, the first view set is empty.

In this embodiment of this application, if it is determined that the first view set is empty, step S810 is performed.

If it is determined that the first view set is not empty, the video note application may have the following three optional execution solutions:

Optionally, if it is determined that the first view set is not empty, step S805 is performed.

Alternatively, if it is determined that the first view set is not empty, step S806 is performed.

Alternatively, if it is determined that the first view set is not empty, step S807 is performed.

S805. Sequentially use a view in the first view set as a current view, and determine whether size information corresponding to the current view is a valid value; and until determining that size information corresponding to a current view is a valid value, determine that the size information of the target record area is the size information corresponding to the current view; or if size information corresponding to each current view is an invalid value, perform step S810.

It may be understood that in the foregoing step S805, if there is one or more view identifiers whose size information is not an invalid value in the first view set, the size information of the target record area is the first view identifier in the one or more view identifiers whose size information is not an invalid value.

For example, a data type of the first view set is a List list type. Each element (view element) from a head of the list to a tail of the list is sequentially traversed as a current view, and it is determined whether size information of the current view is a valid value. If the size information of the current view is a valid value, it is determined that the size information of the target record area is the size information corresponding to the current view, and an element next to the current view in the first view set is not further traversed.

For example, the current view is denoted as a view A. The foregoing step S805 may specifically include: 1) An identifier (view id) of the view A is used as an input parameter, and a .findAccessibilityNotesByViewId(view id) method is invoked by using a target root to determine whether size information corresponding to the view A is recorded in the window information set, where the target root is AccessibilityNoteInfo in window information of an application corresponding to the view A. 2) If the obtained size information of the view A is a valid value (not null), the size information is used as the size information of the target record area, and the next view element in the first view set is not traversed. 3) If the obtained size information of the view A is an invalid value (for example, null or undefined), the view element next to the view A in the first view set is used as a current view, and it is determined whether size information of the current view is a valid value. The rest can be deduced by analogy, until it is determined that size information corresponding to a current view is a valid value. In this case, it is determined that the size information of the target record area is the size information corresponding to the current view. 4) If the size information corresponding to each current view is an invalid value, step S810 is performed.

In this embodiment of this application, if the first view set is an ordered set, for example, a list set, a traversal order of elements in the first view set is the same as an address order of the elements in the set. For example, the first element, the second element, and the like in the first view set are traversed sequentially.

S806. Sequentially use a view in the first view set as a current view, and determine whether size information corresponding to the current view is a valid value; and if the size information corresponding to the current view is a valid value, determine that the size information of the target record area is the size information corresponding to the current view; or if size information corresponding to each current view is an invalid value, perform step S810.

It may be understood that in the foregoing step S806, if there is one or more view identifiers whose size information is not an invalid value in the first view set, the size information of the target record area is the last view identifier in the one or more view identifiers whose size information is not an invalid value.

For example, the current view is denoted as a view A. The foregoing step S806 may specifically include: 1) An identifier of the view A is used as an input parameter, and a .findAccessibilityNotesByViewId(view id) method is invoked by using a target root to determine whether size information corresponding to the view A is recorded in the window information set. 2) If the obtained size information of the view A is a valid value (not null), the size information is used as the size information of the target record area, a view element next to the view A in the first view set is used as a current view, and it is determined whether size information of the current view is a valid value. 3) If the obtained size information of the view A is an invalid value (for example, null or undefined), the view element next to the view A in the first view set is used as a current view, and it is determined whether size information of the current view is a valid value. The rest can be deduced by analogy. 4) If the size information corresponding to each current view is an invalid value, step S810 is performed.

S807. Sequentially use a view in the first view set as a current view, and determine whether size information corresponding to the current view is a valid value; and if the size information corresponding to the current view is a valid value, determine the current view as an element in a second view set.

It may be understood that in the foregoing step S807, if there is one or more view identifiers whose size information is not an invalid value in the first view set, the second view set is a set including the one or more view identifiers whose size information is not an invalid value.

For example, the current view is denoted as a view A. S807 may specifically include: 1) An identifier of the view A is used as an input parameter, and a .findAccessibilityNotesByViewId(view id) method is invoked by using a target root to determine whether size information corresponding to the view A is recorded in the window information set. 2) If the obtained size information of the view A is a valid value (not null), the view A is used as an element in the second view set, a view element next to the view A in the first view set is used as a current view, and it is determined whether size information corresponding to the current view is a valid value. The rest can be deduced by analogy.

In this embodiment of this application, each element in the second view set is a view identifier view id. In some other possible implementations, each element in the second view set may alternatively be size information corresponding to the view identifier, or each element in the second view set may be an element recording an association relationship between the view identifier and the size information corresponding to the view identifier. This is not limited herein.

For example, the video note application displays, in response to the shortcut key operation, the function bar 10 in the user interface 1*b* (first interface) shown in FIG. 1, detects a window state change based on the function bar 10 displayed in the user interface 1*b*, and obtains a window information set corresponding to the user interface 1*b*. If it is determined, based on the window information set, the application whitelist, and the view whitelist, that a package name identifier of the first application (video application) is included in the application whitelist, that is, the application package name set includes the package name identifier of the first application, and a view in which the playing area 201 shown in the first interface (user interface 1*b*) is located is included in the view whitelist, that is, the second view set includes a view identifier of the playing area 201, the electronic device determines that the target record area is the playing area 201, and stores the size information of the target record area. Specifically, size information of the playing area 201 is obtained based on the .findAccessibilityNotesByViewId(view id) method.

S808. Determine whether a quantity N of elements included in the second view set is greater than 0.

In this embodiment of this application, when N is greater than 0, step S809 is performed. When N is equal to 0, step S810 is performed.

S809. Determine the size information of the target record area based on the second view set.

In this embodiment of this application, depending on different quantities N of elements included in the view set, there are the following several scenarios and implementations thereof in step S809 of determining the size information of the target record area based on the second view set.

Manner 1:

N is 1. To be specific, only one view A is recorded in the second view set. If size information corresponding to the view A (for example, a view id A) is a valid value, it is determined that the size information of the target record area is the size information of the view identifier A.

Manner 2:

N is greater than or equal to 2. To be specific, the second view set includes at least two view identifiers. In this case, the target record area is an area corresponding to the last element in the second view set. For example, the view set is data of a list type, and the last element in the view set is a view identifier A and size information of the view identifier A. In this case, the target record area is an area corresponding to the size information of the view identifier A.

Alternatively, in another possible implementation, when N is greater than or equal to 2, the target record area may be an area corresponding to the first element in the view set. This is not limited herein.

Figure 9A:
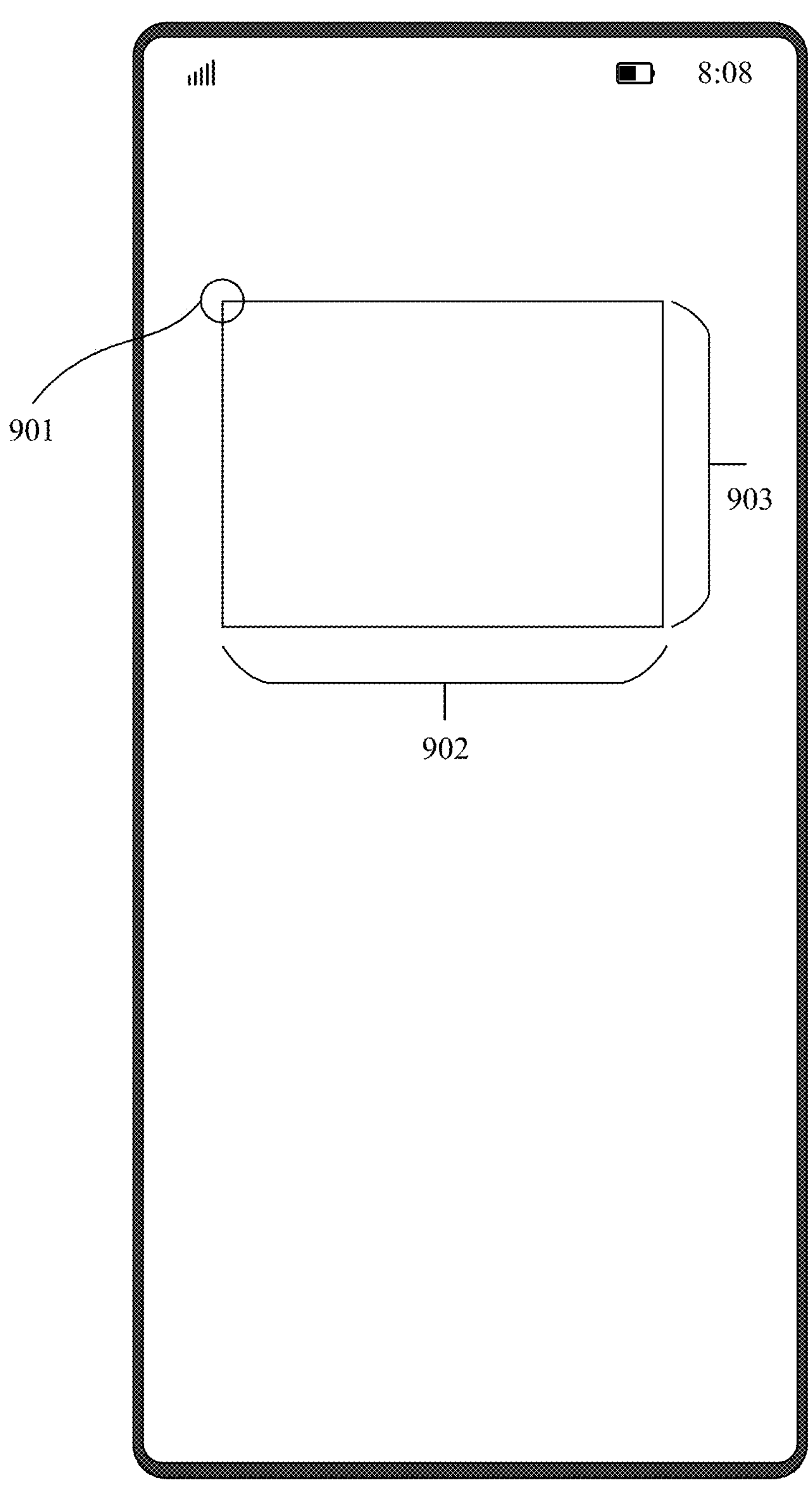
FIG. 9A shows a representation form of size information of a record area according to an embodiment of this application.
Figure 9B:
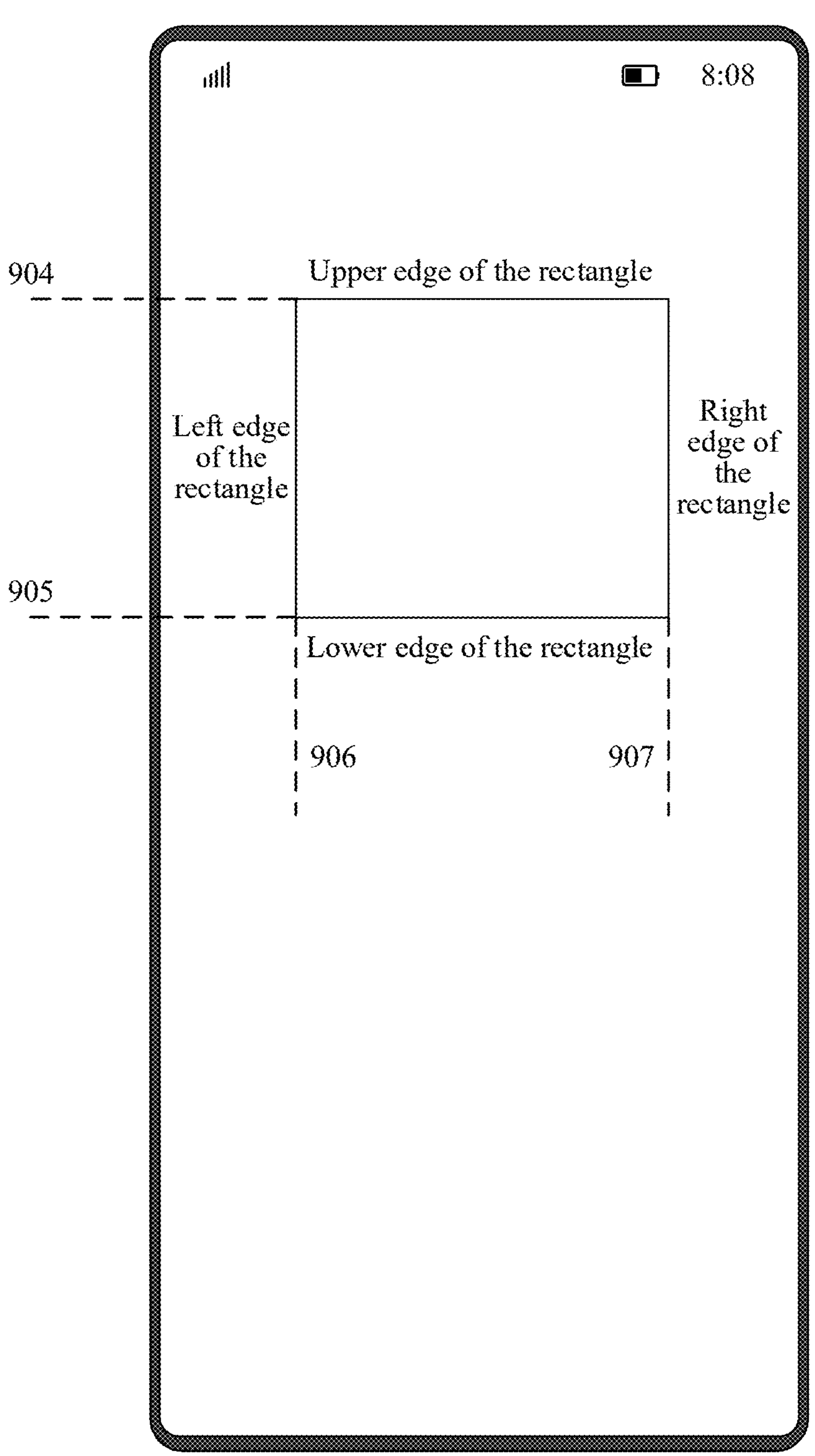
FIG. 9B shows another representation form of size information of a record area according to an embodiment of this application.

Manner 3:

Optionally, representation forms of size information of view identifiers may include a representation form A and a representation form B. On a mobile phone display screen shown in FIG. 9A, in the representation form A, size information of a view identifier is: coordinates (including a horizontal coordinate and a vertical coordinate) 901 of an upper left corner of a rectangle, a width 902 of the rectangle, and a height 903 of the rectangle. It may be understood that an origin of horizontal and vertical coordinates in the representation form A or the representation form B may be a point in any display area on the display screen, which is not limited herein. On a mobile phone display screen shown in FIG. 9B, in the representation form B, size information of a view identifier is: a vertical coordinate 904 of an upper edge of a rectangle, a vertical coordinate 905 of a lower edge of the rectangle, a horizontal coordinate 906 of a left edge of the rectangle, and a horizontal coordinate 907 of a right edge of the rectangle.

In Manner 3, N is greater than or equal to 2, and step S805 of determining the target record area based on the second view set specifically includes: determining, based on at least two views included in the second view set, a minimum rectangular area as the size information of the target record area, where the minimum rectangular area is a minimum rectangular area including each of the at least two views.

For example, if representation forms of size information of the view identifiers recorded in the view set are the representation form A, the representation form of the size information of each view identifier in the view set is converted to the representation form B. Then, based on vertical coordinate information of upper edges of at least two rectangles, vertical coordinate information of lower edges of the at least two rectangles, horizontal coordinate information of left edges of the at least two rectangles, and horizontal coordinate information of right edges of the at least two rectangles that are obtained through conversion, a maximum vertical coordinate of the upper edges of the rectangles, a maximum vertical coordinate of the lower edges of the rectangles, a maximum horizontal coordinate of the left edges of the rectangles, and a maximum horizontal coordinate of the right edges of the rectangles are determined as the size information of the target record area.

For example, if the representation forms of the size information of the view identifiers recorded in the view set is the representation form B, the representation form of the size information of each view identifier in the view set does not need to be converted to the representation form B, but directly based on vertical coordinate information of upper edges of at least two rectangles, vertical coordinate information of lower edges of the at least two rectangles, horizontal coordinate information of left edges of the at least two rectangles, and horizontal coordinate information of right edges of the at least two rectangles that are recorded in the view set, a maximum vertical coordinate of the upper edges of the rectangles, a maximum vertical coordinate of the lower edges of the rectangles, a maximum horizontal coordinate of the left edges of the rectangles, and a maximum horizontal coordinate of the right edges of the rectangles are determined as the size information of the target record area.

Manner 4:

N is greater than or equal to 2. The video note module may determine, based on a tap/click operation of the user, a target record area in size information of at least two recordable views.

Figure 10:
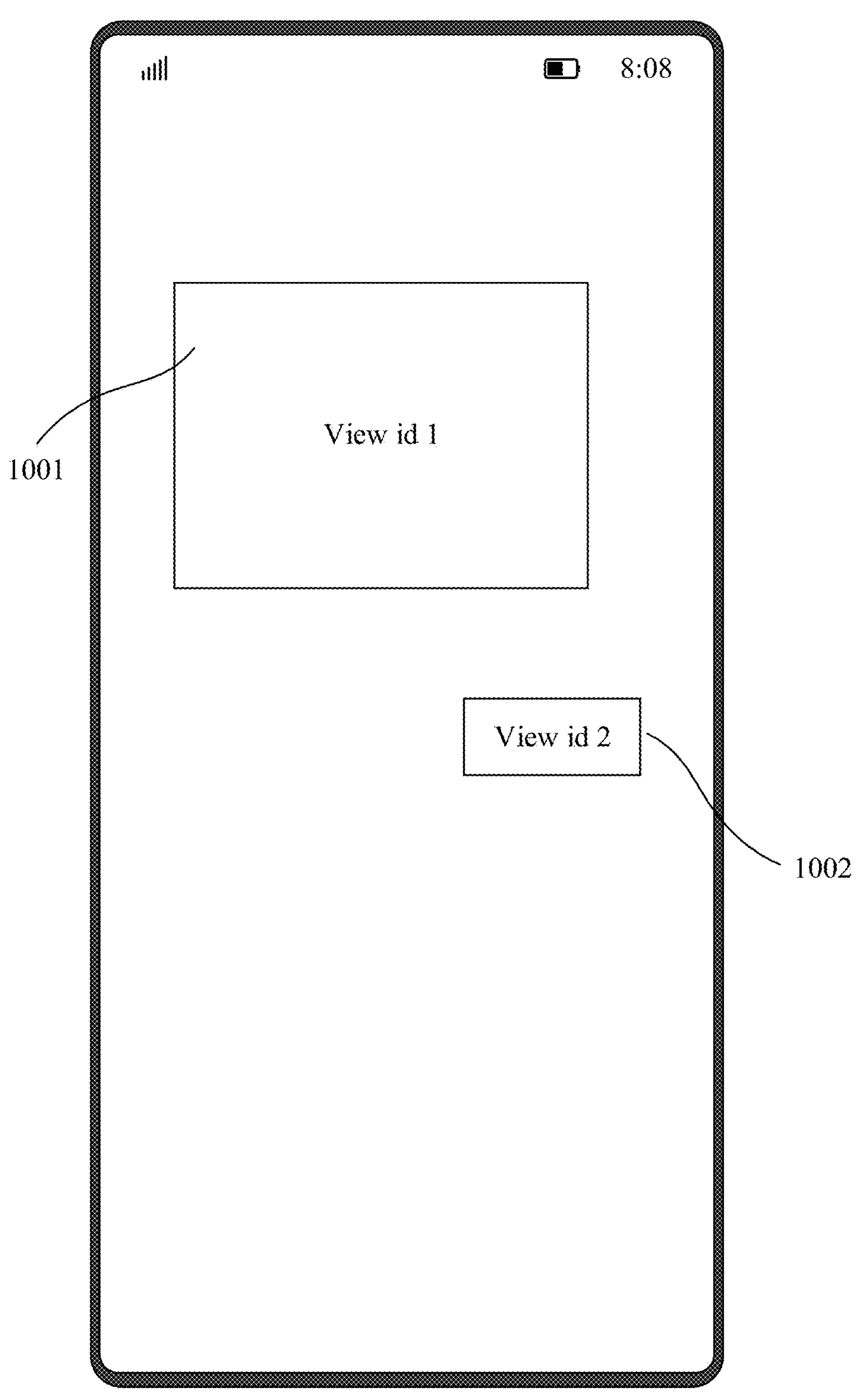
FIG. 10 is a user interface diagram in a scenario in which a quantity N of view ids included in a view set is 2 according to an embodiment of this application.

For example, N is equal to 2. As shown in FIG. 10, the view set includes a view id 1 and size information of the view id 1, and a view id 2 and size information of the view id 2, respectively corresponding to an area 1001 and an area 1002 in FIG. 10. In this case, the electronic device may output prompt information indicating the user to select an area to be recorded, for example, highlight the area 1001 and the area 1002, and pop up a window to inform the user of "there are two recordable areas, please tap/click on one of the areas for recording", so that the target record area may be determined based on a user input. For example, after receiving tap/click coordinates input by the user, it is determined whether the tap/click coordinates are in the area 1001 or the area 1002. If the tap/click coordinates are in the area 1001 and not in the area 1002, it is determined that the target record area is the area 1001. If the tap/click coordinates are in the area 1002 and not in the area 1001, it is determined that the target record area is the area 1002. It may be understood that when the view whitelist is prestored, a view identifier that does not have an intersection area with any view id may be prestored first. In this way, a problem that the tap/click coordinates are included in both the area 1001 and the area 1002 can be avoided. Alternatively, in another possible implementation, areas corresponding to two or more views may be selected as the target record area based on a tap/click operation of the user. This is not limited herein.

S810. Determine the size information of the target record area based on the application package name set.

Depending on different quantities M of elements included in the application package name set, there may be the following several different scenarios and processing manners for determining the target record area based on the application package name set.

Manner 5:

M is equal to 1. To be specific, the application package name set includes only one application package name, for example, referred to as an application package name A.

Specifically, the determining the size information of the target record area based on the application package name set is determining that a display area occupied on the display screen by an application corresponding to the application package name A is the target record area. For example, a window size of an entire interface corresponding to the application is obtained based on the application package name and a GetClientRect( ) method.

For example, in some scenarios, the electronic device is running the video note application, the first application, and a second application. An application package name of the first application is included in the application whitelist, an application package name of the second application is not included in the application whitelist, and a second user interface, displayed on the display screen of the electronic device, of the first application does not have a view included in the view whitelist. In this case, the video note application determines that a display area occupied by the first application on the display screen is the target record area.

Manner 6:

Mis greater than or equal to 2. To be specific, the application package name set includes at least two application package names.

Optionally, the determining the size information of the target record area based on the application package name set may be determining that the target record area is the entire display area of the display screen of the electronic device.

Alternatively, the determining the target record area based on the application package name set may be specifically determining that the target record area includes a display area occupied on the display screen by an application corresponding to each application package name in the application package name set, and the target record area is a continuous area (which may also be understood as that there is no break area).

For example, in display areas occupied on the display screen by applications corresponding to the at least two application package names included in the application package name set, a maximum vertical coordinate value is used as a vertical coordinate of an upper edge of the target record area, a minimum vertical coordinate value is used as a vertical coordinate of a lower edge of the target record area, a minimum horizontal coordinate value is used as a vertical coordinate of a left edge of the target record area, and a maximum horizontal coordinate value is used as a vertical coordinate of a right edge of the target record area.

Alternatively, the determining the target record area based on the application package name set may be specifically: receiving a tap/click operation of the user, determining, from the application package name set based on the tap/click operation of the user, a target application package name whose display area occupied on the display screen includes coordinate information corresponding to the tap/click operation of the user, and using a display area occupied on the display screen by an application corresponding to the target application package name as the target record area.

S811. Determine that the target record area is the entire display area of the display screen of the electronic device.

In this embodiment of this application, if M is equal to 0, it is determined that the target record area is the entire display area of the display screen.

For example, when it is determined that M is equal to 0, the electronic device may further output first prompt information to prompt that there is no separately recordable view and the record area has been set to the full screen.

For example, in some scenarios, the electronic device is running the video note application, the second application, and a third application, and neither the application package name of the second application nor an application package name of the third application is included in the application whitelist. In this case, the video note application determines that the target record area is the entire display area of the display screen.

It should be noted that, the size information corresponding to the current view is the size information of the current view.

In another possible implementation, after it is determined that the first application is an application in the application whitelist, all views in the view whitelist may be traversed (optionally, all views in a view whitelist of the first application may be traversed), to obtain size information of each view in the view whitelist. If a view in the view whitelist is currently displayed, size information of the view can be obtained. In other words, the size information of the view is a valid value (optionally, if the size information is not 0, the size information is a valid value). If the view in the view whitelist is currently not displayed, the size information of the view cannot be obtained. In other words, the size information of the view is an invalid value (optionally, if the size information is 0, the size information is an invalid value).

If the size information of the current view is obtained, or in other words, the size information corresponding to the current view is a valid value, it is determined that the size information of the target record area is the size information corresponding to the current view. If the size information of the current view fails to be obtained, or in other words, the size information corresponding to the current view is an invalid value, size information of a next view is further obtained. It should be further noted that, if size information of a plurality of views is obtained, the size information of the target record area is size information of the latest obtained view. To be specific, for the size information of the target record area, size information of a currently obtained view replaces size information of a previously obtained view.

It should be further noted that, one application may include a plurality of interfaces, and one interface may include a plurality of views. For one interface of one application, it is possible to add only one view to the view whitelist. In this way, when an interface of the application is displayed, only size information of a view included in the currently displayed interface can be obtained, and because the interface includes only one view in the view whitelist, an area in the interface and corresponding to the view in the view whitelist may be used as a target record area.

Figure 8B:
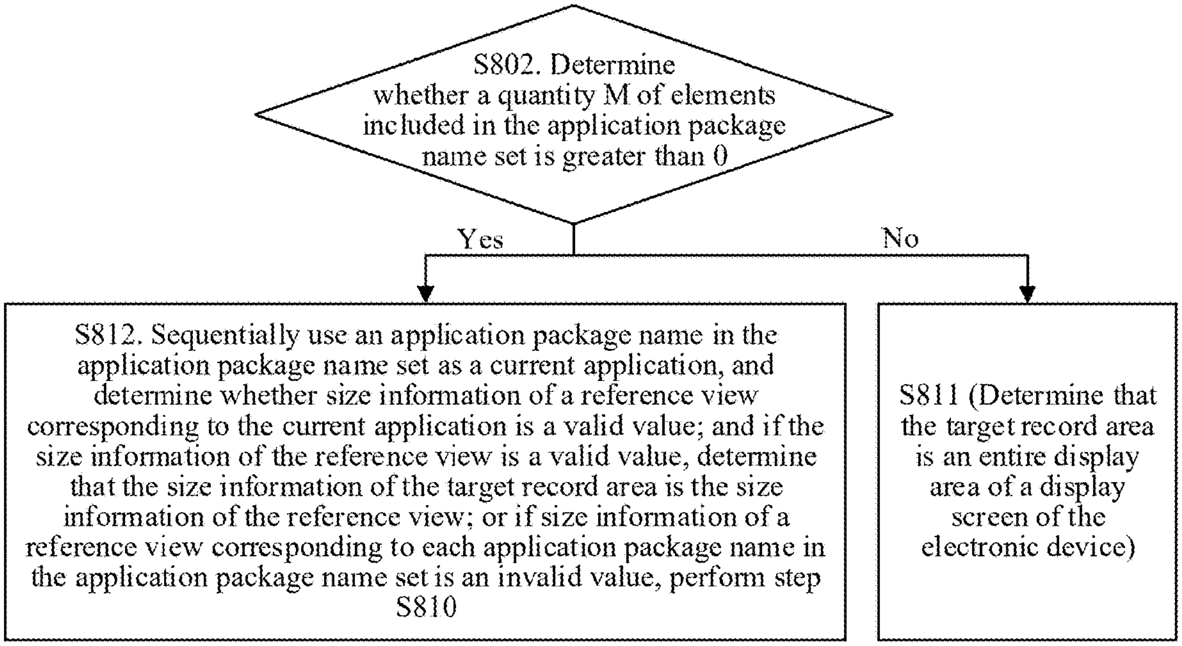
FIG. 8B is another method flowchart of a specific implementation of step S706 in FIG. 7 according to an embodiment of this application.

Optionally, after the foregoing step S802, the size information of the target record area may alternatively be determined based on a step method procedure shown in FIG. 8B. Specifically, as shown in FIG. 8B, after the foregoing step S802, if it is determined that M is greater than 0, step S812 is performed. If it is determined that M is equal to 0, the foregoing step S811 is performed.

S812 specifically includes: sequentially using an application package name in the application package name set as a current application, and determining whether size information of a reference view corresponding to the current application is a valid value; and if the size information of the reference view is a valid value, determining that the size information of the target record area is the size information of the reference view; or if size information of a reference view corresponding to each application package name in the application package name set is an invalid value, performing step S810.

For example, view identifiers recorded in the view whitelist are in one-to-one correspondence with application identifiers recorded in the application whitelist. In other words, each application in the application whitelist corresponds to only one view for which the video note application supports recording. For example, the application whitelist includes an application package name A, and a quantity of view ids in the view whitelist and corresponding to the application package name A is 1. For example, there is only one view id a1 in the view whitelist and corresponding to the application package name A.

Based on the one-to-one correspondence between the view identifiers recorded in the view whitelist and the application identifiers recorded in the application whitelist, the video note application may not need to obtain the first view set, but directly obtain, sequentially through traversal in an address order of elements in the application package name set, size information of a reference view corresponding to a corresponding application package name.

For example, M is equal to 2. In the first application package name set, the first element is an application package name A, and the second element is an application package name B. In the view whitelist, there is only one view id a1 corresponding to the application package name A, and only one view id b1 corresponding to the application package name B. According to addresses of the elements in the application package name set, size information of the view id a1 corresponding to the application package name A is first obtained based on the .findAccessibilityNotesByViewId(view id) method. In the case of obtaining the size information of the view id a1 corresponding to the application package name A, if size information of a view corresponding to the view id a1 can be obtained (in other words, the obtained size information of the view id a1 is a valid value), the size information of the view id a1 is assigned to the target record area, and the traversal continues to obtain, according to the addresses of the elements in the application package name set, size information of the view id b1 corresponding to the application package name B. If the size information of the view id b1 can be obtained (in other words, the size information of the view id b1 is a valid value), the target record area is further updated, which is specifically assigning the size information of the view id b1 to the target record area. If the size information of the view id a1 corresponding to the application package name A cannot be obtained, the traversal continues to obtain, according to the addresses of the elements in the application package name set, the size information of the view id b1 corresponding to the application package name B, and a value of the target record area is determined based on whether the size information of the view id b1 is a valid value. If no valid size information can be obtained in the process of obtaining, through traversal according to the addresses of the elements in the application package name set, the size information of the view corresponding to each application package name in the application package name set, the foregoing step S811 is performed.

To be specific, the size information of the target record area is size information corresponding to the last view id whose size information (or the size information is referred to as a valid value) can be obtained in M view ids, where the M view ids are views that are in the view whitelist and that are respectively corresponding to M application package names in the application package name set.

The following describes how the electronic device performs, after receiving a start screen recording instruction based on the video note application, the screen recording method provided in this embodiment of this application.

Figure 2:
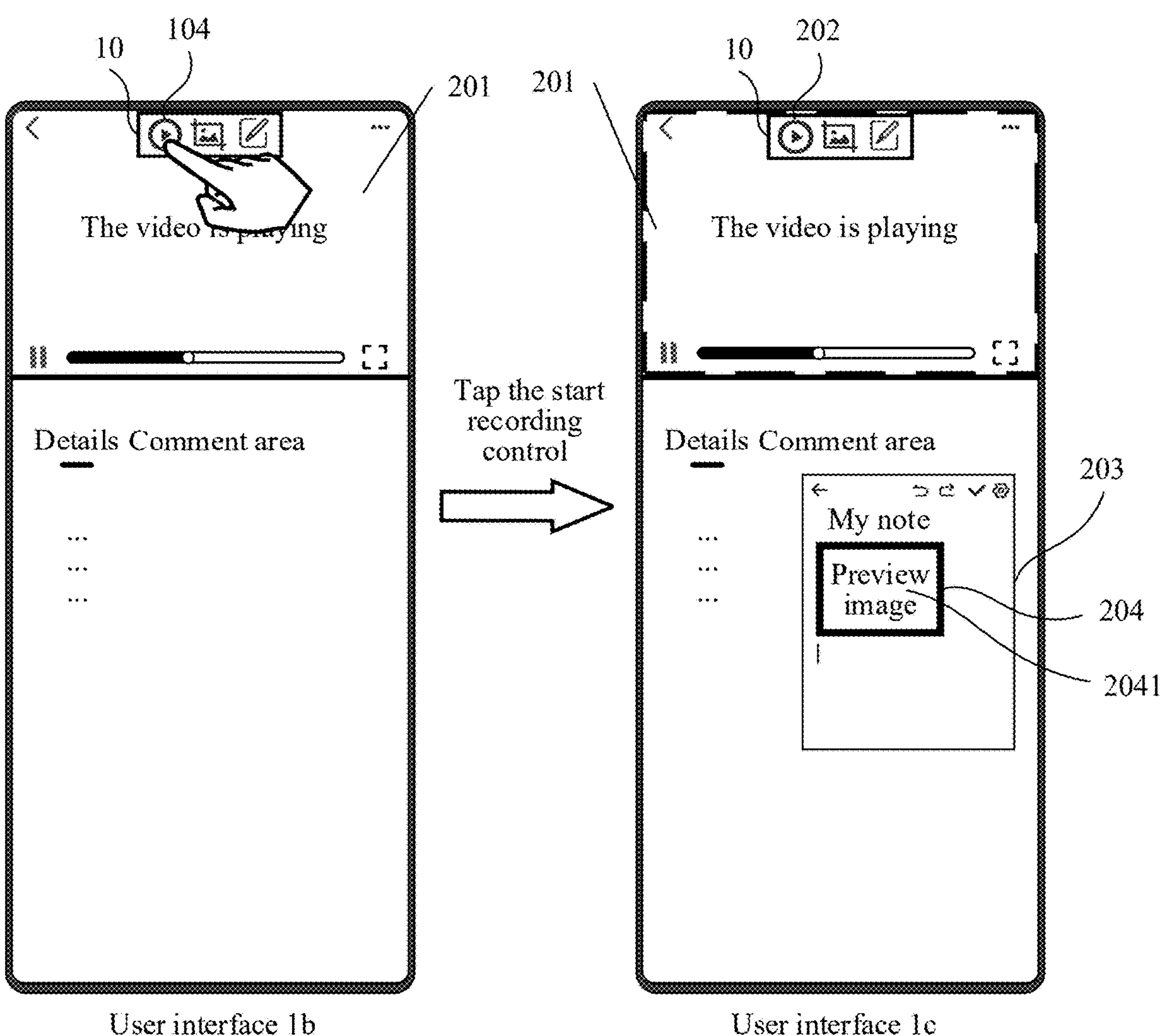
FIG. 2 is a related user interface diagram showing that an electronic device starts screen recording in response to a tap/click operation on a start screen recording icon according to an embodiment of this application.

For example, with reference to the user interface 1*b* in FIG. 2, in response to a tap/click operation on the start screen recording icon 104, and based on that in window information corresponding to the user interface 1*b*, a package name of the video application is included in the application whitelist, and a view in which the playing area 201 shown in the first interface (the user interface 1*b* or the user interface 1*c*) is located is included in the view whitelist, the electronic device determines that the target record area is the playing area 201.

After determining that the target record area is the playing area 201, the electronic device starts recording display content corresponding to the playing area 201, and displays the user interface 1*c* shown in FIG. 2, where in the function bar 10, an end screen recording icon 202 is displayed, and the start screen recording icon 104 is not displayed; and newly creates a note document 203 for recording recorded screen data, and displays the note document 203 in a floating-window manner in a display area at a lower right corner of the display screen, where a first preview image 2041 is displayed in a preview area 204 in an editing area of the note document 203. It may be understood that in background implementation of the electronic device, the start screen recording icon 104 and the end screen recording icon 202 are implemented by using a same control, except that a corresponding display icon in the control changes correspondingly at different recording occasions.

The first preview image 2041 may be an image frame, corresponding to a start moment when the electronic device starts recording, of the target record area, or the first preview image 2041 may be an image frame corresponding to a current recording moment and the target record area. This is not limited herein.

In some possible implementations, during screen recording, a recording duration may be further displayed in the function bar 10. Alternatively, if a maximum recording duration (for example, 5 minutes) is set for a screen recording duration, and it is limited that a recording duration of currently recorded screen data cannot be greater than the maximum recording duration, the function bar 10 may further display a recording countdown corresponding to the maximum recording duration.

It may be understood that in some other scenarios, the electronic device may have started the video note application before receiving the tap/click operation on the start screen recording icon 104. For example, before tapping/clicking the start screen recording icon 104 or before performing the shortcut key operation, the user opens a note document A that has been created in the video note application. The electronic device may display an interface of the note document A on the display screen. For example, the interface of the note document A may be displayed in a floating-window manner in the display area at the lower right corner of the display screen, or the interface of the note document A may be displayed in an image layer on the display screen other than the uppermost layer. In this scenario, in response to the tap/click operation on the start screen recording icon 104, after determining that the target record area is the playing area 201, the electronic device starts recording the display content corresponding to the playing area 201, uses the note document A as a note document for recording recorded screen data, instead of newly creating the note document 203 for recording recorded screen data, displays the note document A in a floating-window manner, and displays the first preview image 2041 in an editing area of the note document A.

In a possible implementation, during screen recording, display brightness of the target screen recording area on the display screen is higher than brightness of another display area. For example, display brightness of the playing area 201 in the user interface 1*c* is higher than brightness of another display area.

As shown in the user interface 1*c* of FIG. 2, the preview area 204 is in a line above a cursor in the text editing area. This is merely an example. Alternatively, the preview area 204 may be at another position, for example, behind the cursor. This is not limited herein.

For example, in response to the tap/click operation on the start screen recording icon 104, the electronic device specifically performs the following steps S706 to S708.

S706. The video note application receives a start screen recording instruction.

To be specific, the video note application receives the tap/click operation on the start screen recording icon 104.

In a possible implementation, the tap/click operation on the start screen recording icon 104 is a tap/click operation on a view, and belongs to a type of window state change (window state change). Therefore, when receiving the start screen recording instruction, the video note application may detect, based on the accessibility service child class, an event of the window state change related to the start screen recording instruction, and then perform the foregoing steps S704 and S705.

Alternatively, in another possible implementation, after receiving the start screen recording instruction and before receiving an end screen recording instruction next time, if the accessibility service child class detects a window state change again, the video note application is preset not to perform the obtaining a window information set in the foregoing step S704 or perform the foregoing step S705. In other words, after receiving the tap/click operation on the start screen recording icon 104, the video note application does not perform the foregoing steps S704 and S705.

S707. The video note application sends the size information of the target record area to a screen recording program. Correspondingly, the screen recording program receives the size information of the target record area.

For example, before the start screen recording instruction is received, the size information of the target record area that is determined and stored by the video note application based on the foregoing steps S703 to S705 is the size information corresponding to the playing area 201 in the user interface 1*c* shown in FIG. 2. Specifically, in the user interface 1*c* shown in FIG. 2, the application package name set includes the application package name of the first application, the first view set includes the view id of the view corresponding to the playing area 201, and the size information of the target record area is the size information corresponding to the playing area 201.

In this embodiment of this application, the screen recording program is a system screen recording program owned by the electronic device. Corresponding to the software architecture diagram shown in FIG. 13, the screen recording program is a screen recording application module in the application layer.

S708. The screen recording program records display content corresponding to the target record area, to obtain recorded screen data.

For example, the video note application sends an end screen recording instruction to the screen recording program in response to an operation of ending screen recording. After receiving the end screen recording instruction, the screen recording program ends screen recording to generate a video file (recorded screen data). It may be understood that the video note application may determine, based on a tap/click operation performed by the user on the end screen recording icon, to end screen recording, and send the end screen recording instruction to the screen recording program. Alternatively, in some other possible implementations, the video note application may determine, based on a preset first duration and a screen recording start moment, that a screen recording duration is equal to the first duration, and then send the end screen recording instruction to the screen recording program. This is not limited herein.

Generally, size information of a screen recording area recorded in the screen recording program in the electronic device is consistent with size information of the display screen by default. For example, a class for storing the size information of the screen recording area is a screen recording model (ScreenRecordModel). In this embodiment of this application, after receiving the size information of the target record area, the screen recording program may set the size information of the record area to be consistent with the size information of the target record area, to replace the default size information of the display screen.

For example, in this embodiment of this application, on the basis that the size information of the record area recorded in the screen recording model (ScreenRecordModel) of the electronic device is the size information of the display screen by default, a "screen recording parameter setting (setVideoArea) method" is added based on a system-provided screen recording service (ScreenRecordService). In the set VideoArea method, the size information of the screen recording area recorded in ScreenRecordModel may be reset.

For example, after the video note application sends the size information of the target record area to the system screen recording service (ScreenRecordService), ScreenRecordService notifies the set VideoArea method of the size information of the target record area, and sets, based on the setVideoArea method, the size information of the screen recording area recorded in ScreenRecordModel to be consistent with the size information of the target record area.

Optionally, that the video note application obtains a window information set based on the accessibility service after detecting a window state change may be specifically obtaining the window information set based on the accessibility service when the accessibility service detects a window state change and the video note application is currently not in a screen recording state. To be specific, during screen recording, if the video note application detects a window state change based on the accessibility service, the video note application does not obtain the window information set. Instead, during non-screen-recording, when the video note application detects a window state change based on the accessibility service, the video note application obtains the window information set.

Optionally, during screen recording, if the video note application detects a window state change based on the accessibility service, the video note application may alternatively obtain the window information set, and update the size information of the target record area when the size information of the target record area needs to be updated. However, it may be understood that updated size information of the target record area does not affect a record area currently in a process of recording.

Figure 3:
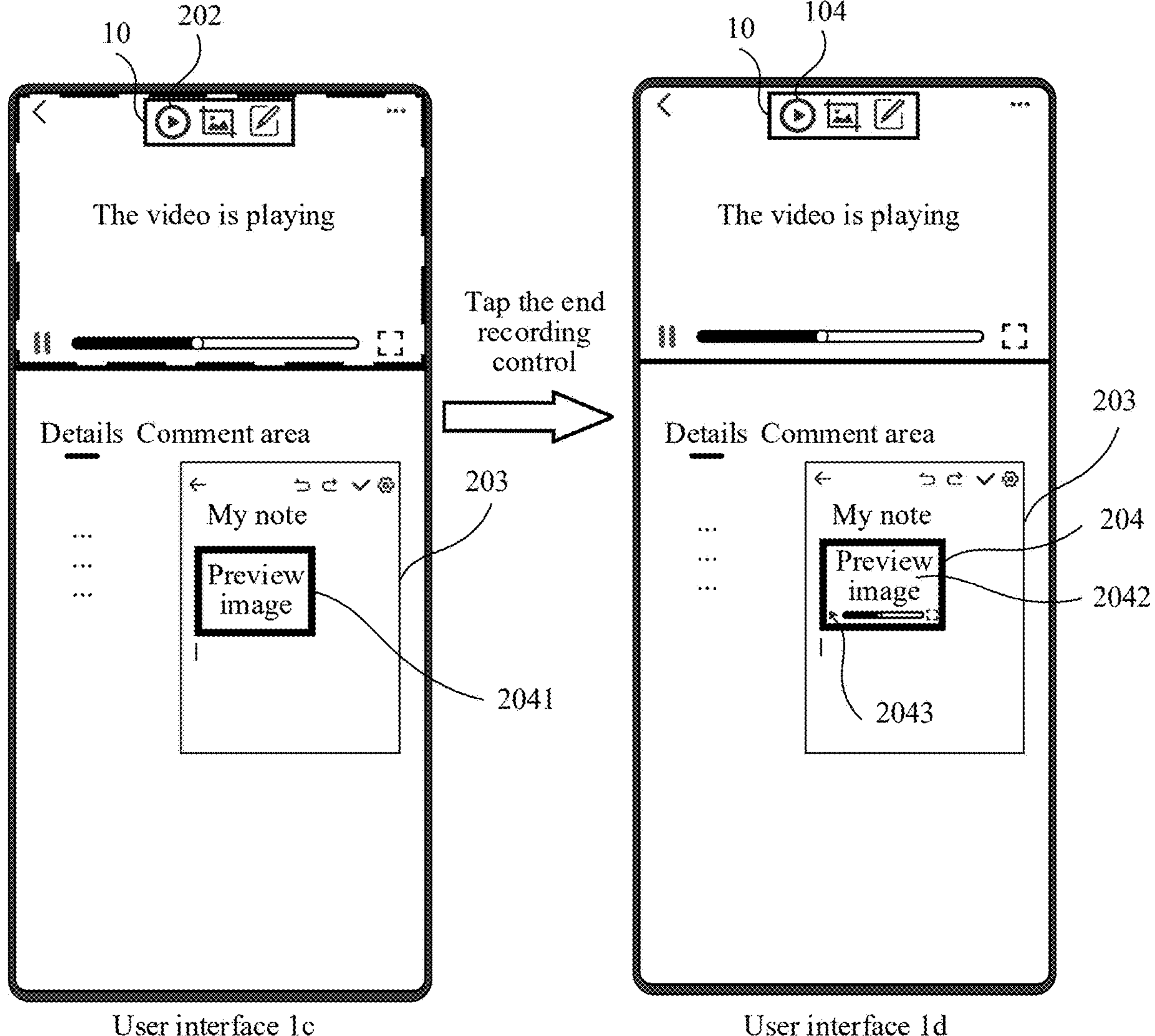
FIG. 3 is a related user interface diagram showing that an electronic device ends screen recording in response to a tap/click operation on an end screen recording icon according to an embodiment of this application.

For example, with reference to a user interface 1*c* and a user interface 1*d* in FIG. 3, after receiving a tap/click operation on the end screen recording icon 202 in the user interface 1*c*, the electronic device displays the user interface 1*d* in FIG. 3. Specifically, in response to the tap/click operation on the end screen recording icon 202, the electronic device ends recording and generates a first video file (corresponding to the recorded screen data), displays the start screen recording icon 104 and does not display the end screen recording icon 107 in the function bar 10, and displays a second preview image 2042 and a start playing icon 2043 in the preview area 204 of the note document 203. In response to a tap/click operation on the start playing icon 2043, the electronic device may play the first video file. A difference from the user interface 1*c* lies in that during screen recording, content displayed in the preview area 204 shown in the user interface 1*c* does not include the start playing icon 2043.

The second preview image 2042 and the first preview image 2041 show a same image. For example, the first preview image 2041 is an image frame corresponding to a start recording moment when the display content in the playing area 201 starts to be recorded, and the second preview image 2042 is an image frame that is in the first video file and that is corresponding to the start moment. It may be understood that depending on specific design, the first preview image 2041 may alternatively be inconsistent with the second preview image 2042. This is not limited herein.

For example, the first video file may be stored in a storage directory corresponding to the video note application, whose data format may be an mp4 format. Alternatively, in a possible implementation, in response to a tap/click operation on any position in the preview area 204, the first video file starts to be played, and in response to another tap/click operation on any position in the preview area 204, playing of the first video file is ended.

In some other possible implementations, after ending recording in response to the tap/click operation on the end screen recording icon 202, the electronic device may further display a recording duration of the video file, a playing progress bar, a zoom-in-to-full-screen icon, and the like in the preview area 204. This is not limited herein.

In some other scenarios, if in the user interface 1*c*, there is one or more other views included in the view whitelist, in addition to the playing area 201, the target record area may be a minimum rectangular area including the playing area 201 and a display area corresponding to each of the one or more other views.

Figure 4:
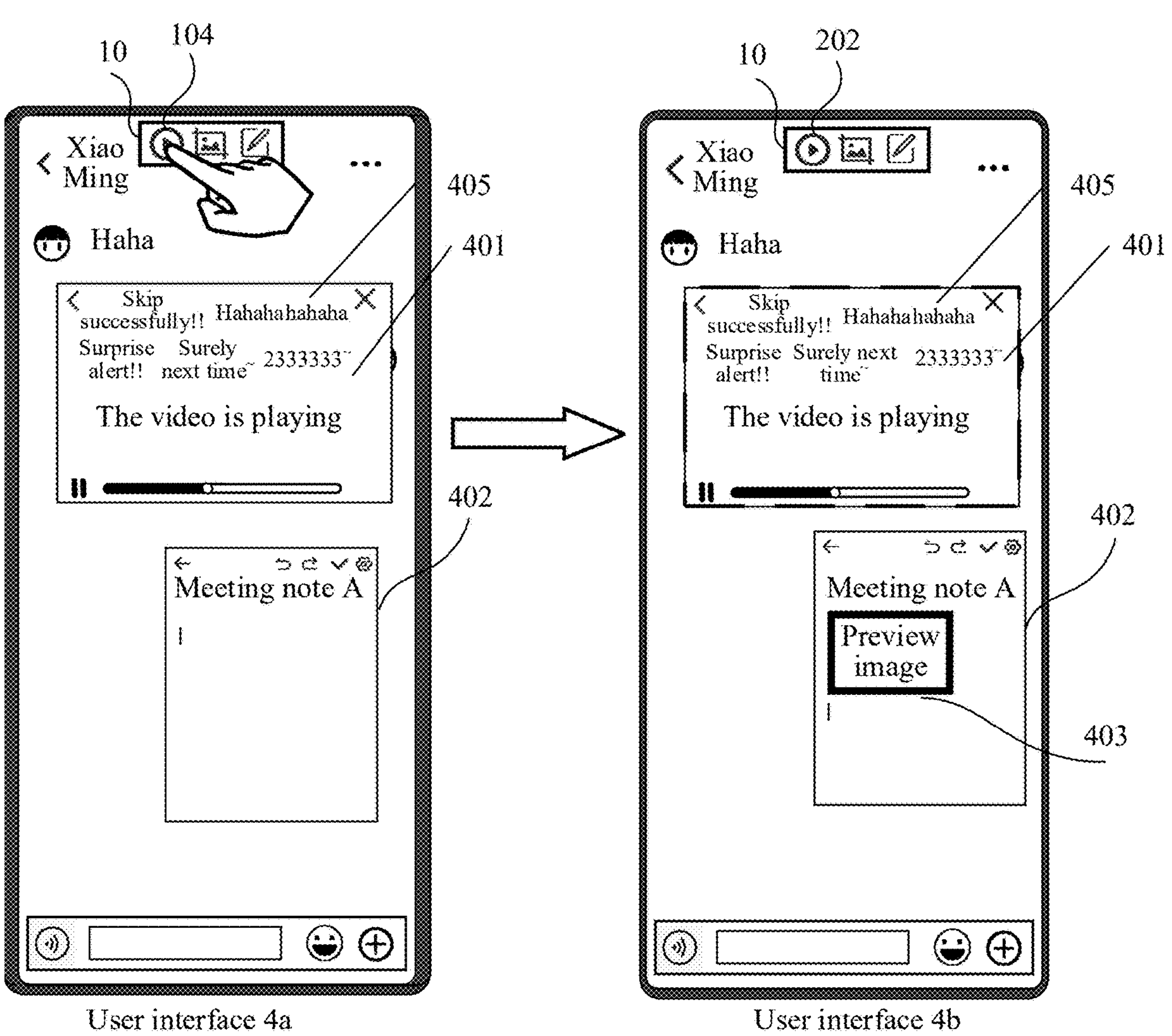
FIG. 4 is a related user interface diagram of performing screen recording in a floating-window scenario by using a screen recording method provided in this application according to an embodiment of this application.

Scenario 2:

As shown in a user interface 4*a* in FIG. 4, the electronic device is a mobile phone terminal. The electronic device is running a first application (for example, the video application), a second application (for example, a chat application), and the video note application, and the electronic device displays a page of the chat application on the display screen in a full-screen manner, displays, on the display screen in a floating-window manner, a page in which the video application is playing a video, and displays, on the display screen in a floating-window manner, a note document 402 with a topic "meeting note A" in the video note application. For example, the user manually reduces an interface corresponding to the video note application into a floating window and moves the floating window to a display area corresponding to the note document 402 in FIG. 4. In this scenario, in response to the shortcut key operation, the electronic device displays a function bar 10 shown in the user interface 4*a*. Specifically, in response to the shortcut key operation, the electronic device performs the foregoing steps S701 to S705. In step S705, based on that an application package name of the first application (video application) is included in the application whitelist, an application package name of the second application (chat application) is not included in the application whitelist, and a view corresponding to a window corresponding to the first application, that is, a playing area 401 in the user interface 4*a*, is included in the view whitelist, it is determined that the size information of the target record area is size information corresponding to a view id of the view corresponding to the playing area 401, and the size information of the target record area is stored.

In response to a tap/click operation on a start screen recording icon 104 in the user interface 4*a*, the electronic device reads the stored size information of the target record area (which is specifically the size information corresponding to the view id of the view corresponding to the playing area 401), starts recording display content corresponding to the playing area 401, and displays a user interface 4*b* shown in FIG. 4. Specifically, in the function bar 10, an end screen recording icon 202 is displayed and the start screen recording icon 104 is not displayed; and a preview image 403 is displayed in a preview area in an editing area of the note document 402. For descriptions of the preview image, refer to related descriptions of other embodiments herein. Details are not described herein again. Specifically, through the foregoing steps S707 and S708, the playing area 401 is recorded, and in response to a tap/click operation on the end screen recording icon 202, recording is ended, and a video file A is generated. The video file A includes the display content in the playing area 401.

In this embodiment of this application, during screen recording, the electronic device records display content other than display content of the video note application in display content in an area corresponding to the size information of the target record area.

For example, before the display content in the playing area 401 starts to be recorded, there is a first overlapping area between the display area of the note document 402 and the playing area 401 in the user interface 4*b*. In this case, optionally, in the first overlapping area, an interface corresponding to the note document 402 has a higher display priority than the interface (that is, an interface corresponding to the playing area 401) of the first application. However, when the display content in the playing area 401 starts to be recorded, the electronic device may mask the display content of the note document 402, and does not record the display content corresponding to the video note application, but record display content in the target record area other than the display content of the interface of the note document. Finally, the video file A obtained through recording includes video content, bullet comment content, and the like played in the playing area 401 by the first application, and does not include interface content of the note document 402.

For example, before the display content in the playing area 401 starts to be recorded, there is a second overlapping area between an interface of another application and the display area of the interface of the first application in the user interface 4*b*. The another application is an application other than the video note application and the first application. For example, the interface of the another application is the interface corresponding to the chat application. In this case, optionally, in the second overlapping area, the interface of the another application has a higher display priority than the interface (that is, the interface corresponding to the playing area 401) of the first application. In addition, when the display content in the playing area 401 starts to be recorded, the electronic device records display content in the second overlapping area in the playing area 401, which is specifically recording display content of the interface of the another application in the second overlapping area, rather than recording display content of the playing interface of the first application in the second overlapping area, and the electronic device records display content in an area in the playing area 401 other than the second overlapping area, which is specifically recording display content of the playing interface of the first application in the another area. Finally, the final video file A obtained through recording includes the display content of the interface of the another application in the second overlapping area and the display content of the playing interface of the first application in the another area, and does not include the display content of the playing interface of the first application in the second overlapping area.

In this embodiment of this application, screen recording on the target record area is recording display content in a display area that is on the display screen and that is corresponding to a size of the target record area, which may include video content and bullet comment content corresponding to current video content, instead of recording only a video stream. For example, in some possible scenarios, the playing area 401 in the user interface 4*a* further displays bullet comment content 405, and the video file A obtained by recording, by using the screen recording method provided in this application, the display content corresponding to the playing area 401 includes adapted content played in the playing area 401 and the bullet comment content 405.

Figure 5A:
FIG. 5A and FIG. 5B are related user interface diagrams of performing screen recording in a split-screen scenario by using a screen recording method provided in this application according to an embodiment of this application.
Figure 5A:
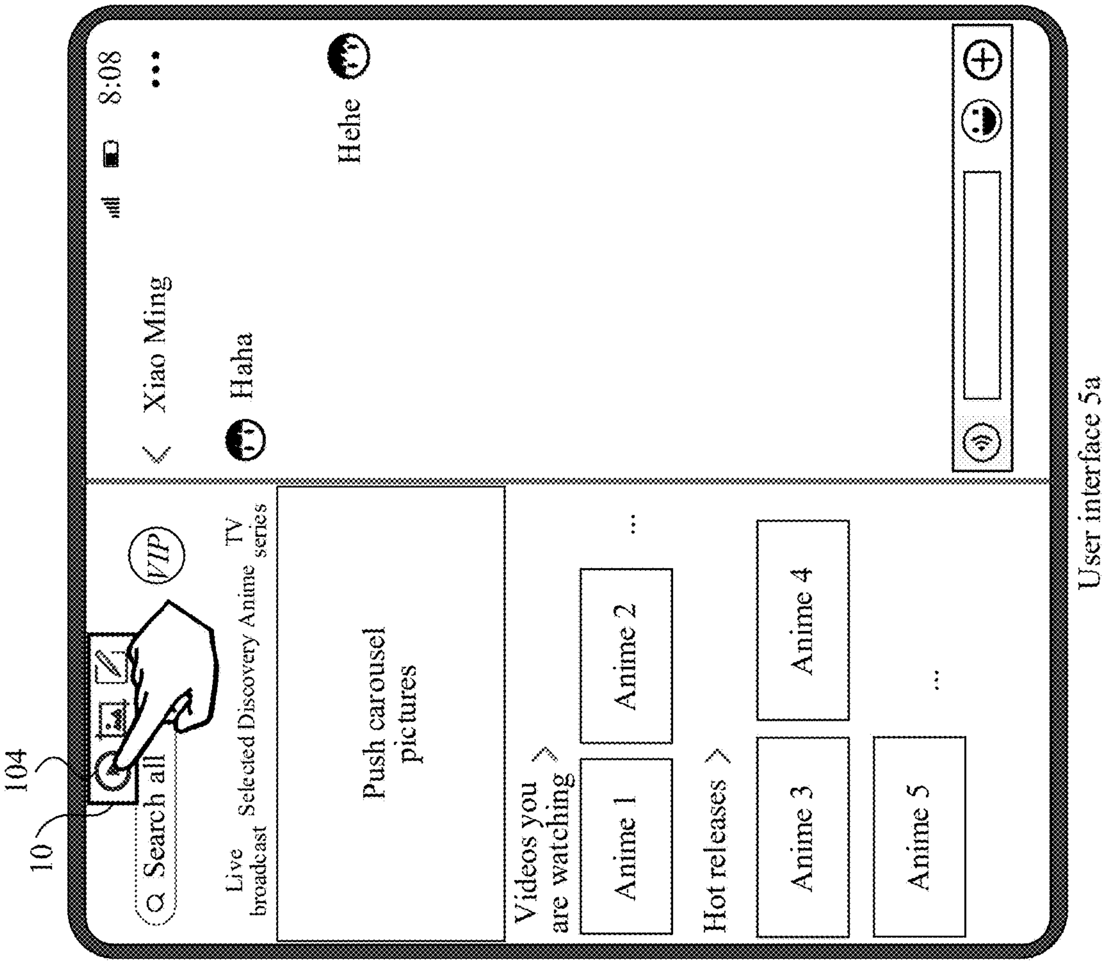

Scenario 3:

As shown in a user interface 5*a* in FIG. 5A, the electronic device is a foldable-screen mobile phone terminal or a tablet terminal. The electronic device displays a second interface of a first application (video application) in a left display area of the display screen, and displays a page of a second application (for example, the chat application) in a right display area of the display screen. In this scenario, in response to the shortcut key operation, the electronic device displays a function bar 10 shown in the user interface 5*a*. Specifically, in response to the shortcut key operation, the electronic device performs the foregoing steps S701 to S705. In step S705, based on that an application package name of the first application is included in the application whitelist, an application package name of the second application is not included in the application whitelist, and a view corresponding to the second interface corresponding to the first application is not included in the view whitelist, that is, a view corresponding to each display area in the user interface 5*a* is not included in the view whitelist, it is determined that the size information of the target record area is an entire interface 501 of the second interface, and the size information of the target record area is stored. This meets a screen area recording requirement in a split-screen scenario.

Figure 5B:
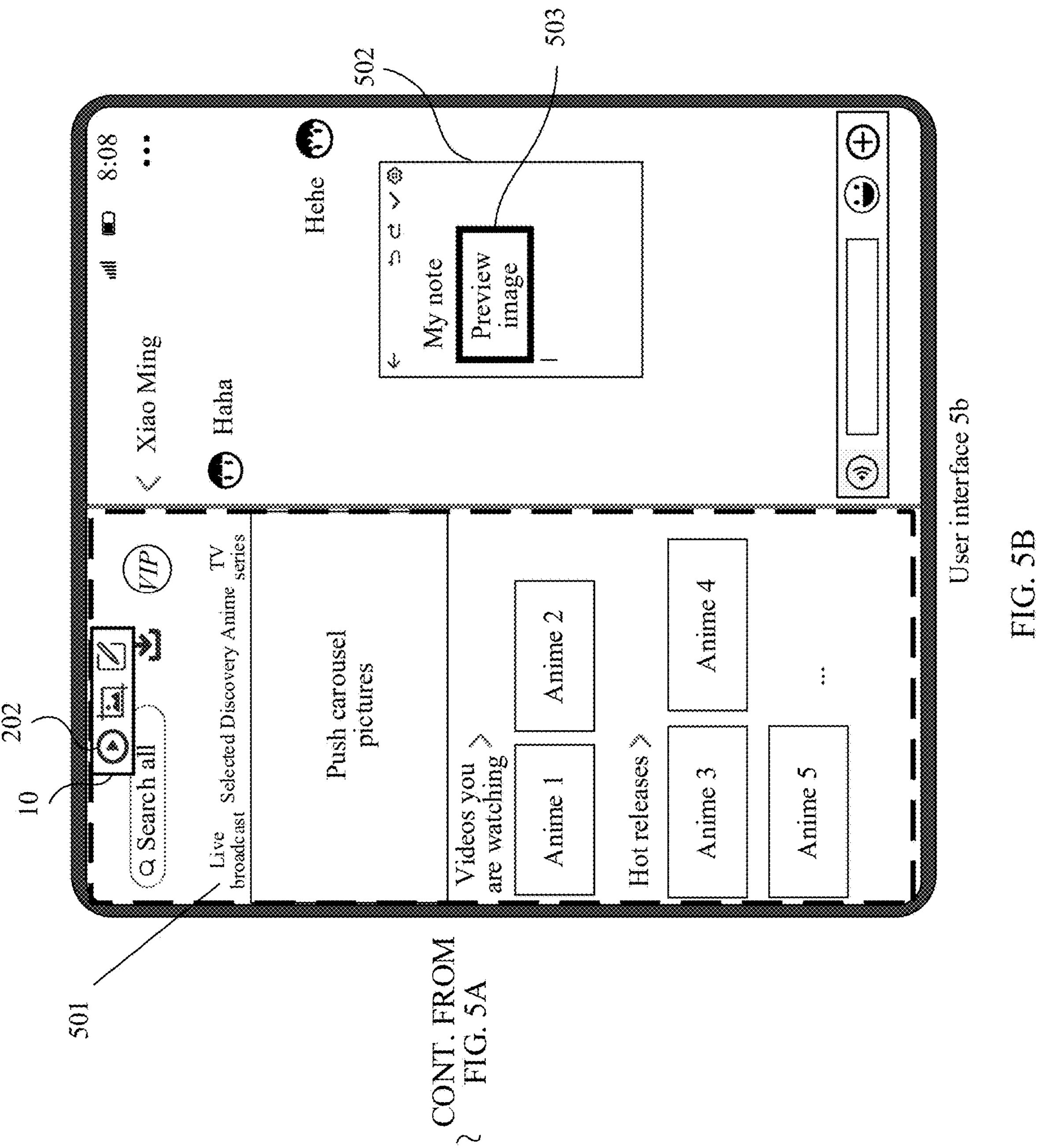

In response to a tap/click operation on a start screen recording icon 104 in the user interface 5*a*, the electronic device starts recording display content corresponding to the entire interface 501 of the video application, and displays a user interface 5*b* shown in FIG. 5B. Specifically, in the function bar 10, an end screen recording icon 202 is displayed and the start screen recording icon 104 is not displayed; and a newly created note document 502 for recording recorded screen data is displayed in a floating-window manner in a display area at a lower right corner of the display screen, and a preview image 503 is displayed in an editing area of the note document 502. Specifically, through the foregoing S707 and S708, the display content of the entire interface 501 of the second interface is recorded, and in response to a tap/click operation on the end screen recording icon 202, recording is ended, and a second video file is generated. The second video file includes the display content of the entire interface 501 of the second interface and does not include display content of the interface of the second application.

It may be understood that, in user interfaces provided in this embodiment of this application, during screen recording, an interface in which a preview image is displayed in a floating-window manner through a video note document is mostly displayed at a lower right corner position of the screen as an example, but a specific display position of the interface corresponding to the video note document is not limited herein. For example, in some other scenarios, in the user interface 5*b*, if the interface of the second application (chat application) is displayed on a left half of the display screen, and the second interface of the first application (video application) is displayed on a right half of the display screen, after the electronic device determines that the target record area is the entire interface 501 of the second interface, the electronic device may display the video note document 502 in a lower left corner area of the display screen, instead of displaying the video note document 502 in a lower right corner area of the display screen.

Figure 6A:
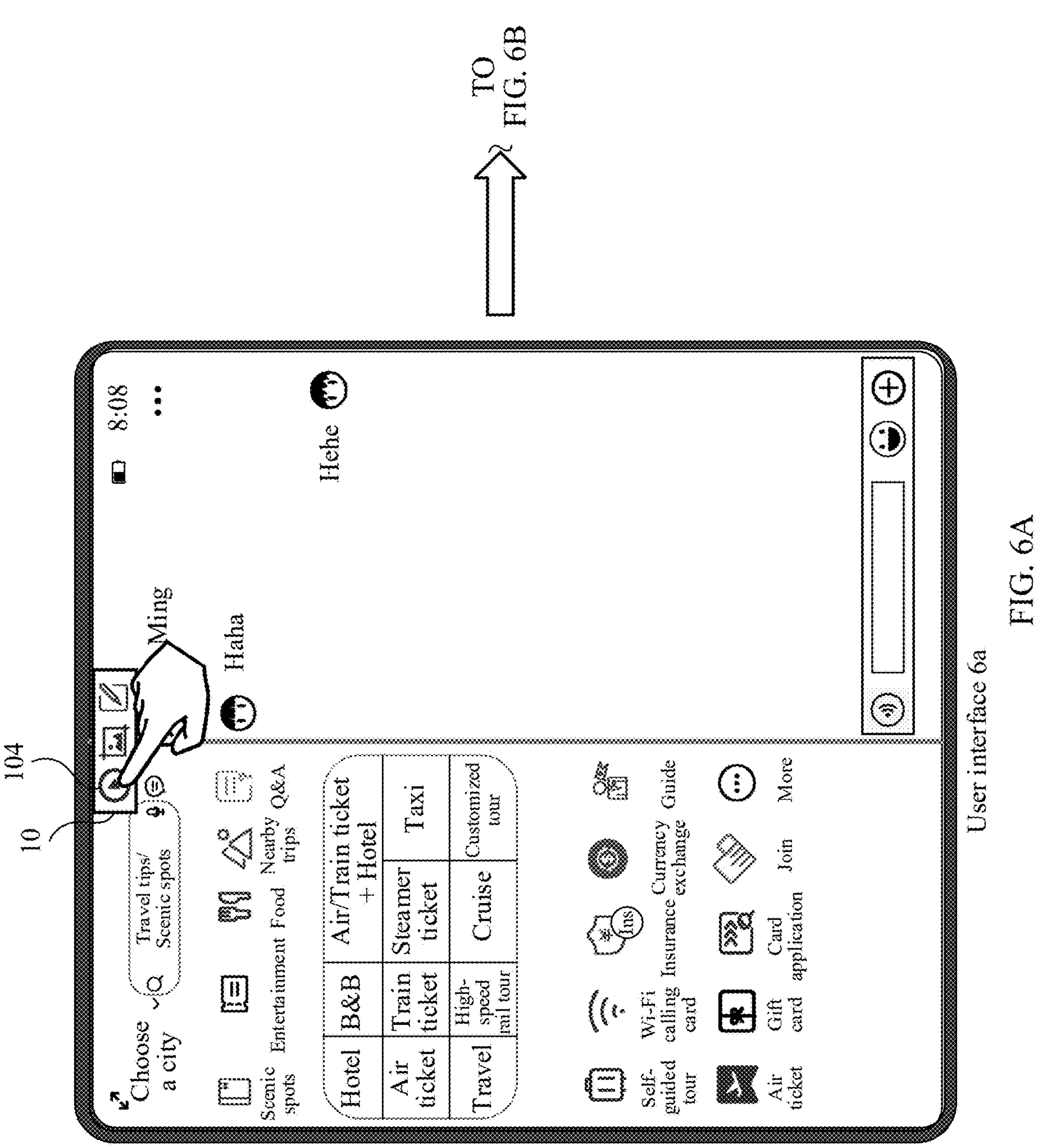
FIG. 6A and FIG. 6B are other related user interface diagrams of performing screen recording in a split-screen scenario by using a screen recording method provided in this application according to an embodiment of this application.

Scenario 4:

As shown in a user interface 6*a* in FIG. 6A, the electronic device is a foldable-screen mobile phone terminal or a tablet terminal. The electronic device displays a page of a third application (for example, a travel application) in a left display area of the display screen, and displays a page of a second application (for example, the chat application) in a right display area of the display screen. In this scenario, in response to an operation instruction for the shortcut key, the electronic device displays a function bar 10 shown in the user interface 6*a*. Specifically, in response to the shortcut key operation, the electronic device performs the foregoing steps S701 to S705. In step S705, based on that neither of application package names of the second application and the third application is included in the application whitelist, it is determined that the size information of the target record area is size information corresponding to the entire display area of the display screen, and the size information of the target record area is stored.

Figure 6B:
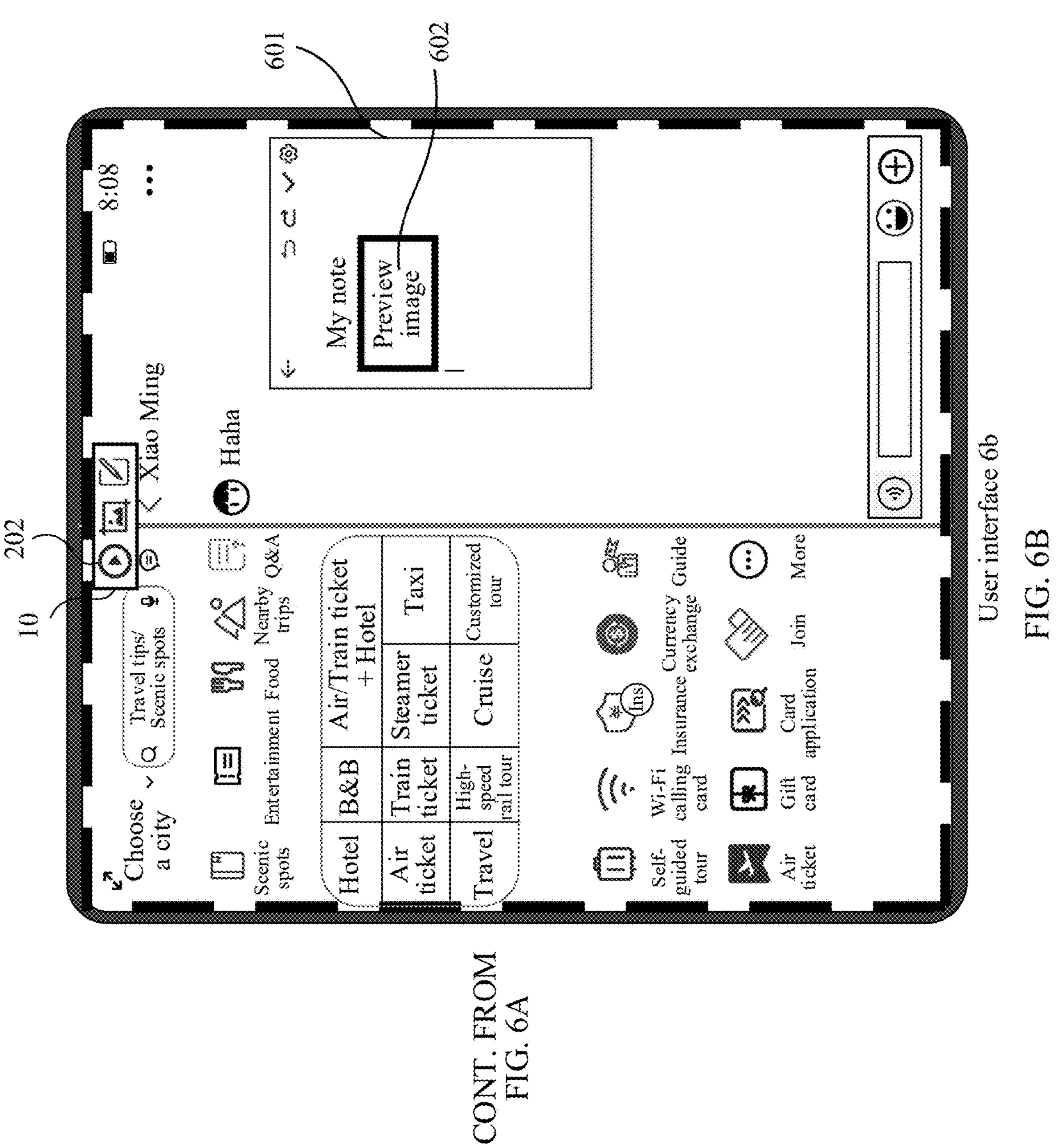

In response to a tap/click operation on a start screen recording icon 104, the electronic device starts recording display content corresponding to the entire display area of the display screen of the electronic device, and displays a user interface 6*b* shown in FIG. 6B. Specifically, in the function bar 10, an end screen recording icon 202 is displayed and the start screen recording icon 104 is not displayed; and a newly created note document 601 for recording recorded screen data is displayed in a floating-window manner on the display screen, and a preview image 602 is displayed in an editing area of the note document 601.

In some other scenarios, the user interface 6*b* (or the user interface 6*a*) may further display an interface of one or more other applications whose application package name is not included in the application whitelist. This is not limited herein. Correspondingly, the size information corresponding to the target record area is still the size information of the display area of the display screen.

Optionally, a position of the function bar 10 may be in the midmost of the display screen, or may be at a left edge or a right edge of the display area of the display screen. This is not limited herein.

Optionally, the size information of the target record area is recorded in the video note application, and the position of the function bar 10 may be a middle position of the target record area, or at a left edge or a right edge of the target record area. The target record area is used to indicate size information of a currently recordable area of the electronic device. An area recorded when the electronic device starts recording is consistent with the size information of the target record area. A default size of the recordable area may be a size of the display area corresponding to the display screen. The electronic device may determine the size information of the target record area based on the foregoing step S706. Specifically, when running the video note application, in response to the shortcut key operation, the electronic device calls up the function bar 10, determines the size information of the target record area based on the foregoing steps S704 to S706, and determines that the position of the function bar 10 is the middle position of the target record area.

It should be noted that, in all of the foregoing scenario 1 to scenario 4, a manner of calling up the function bar 10 of the video note application is using a corresponding shortcut key, which does not indicate that the function bar 10 can be called up only by using the shortcut key, but other operation manners may be used. This is not limited herein. For example, a virtual control A for calling up the function bar 10 may be provided in the video note application. When receiving a tap/click operation on the virtual control A, the electronic device calls up the function bar 10.

Optionally, after starting screen recording in response to the tap/click operation on the start screen recording icon 104, the electronic device may further collapse (or referred to as hide) the function bar 10, or in other words, not display the function bar 10, and display the function bar 10 again in response to a tap/click operation on the record area.

The foregoing steps S701 to S708 are described below in detail with reference to a timing diagram of program code classes shown in FIG. 11A to FIG. 11C. Correspondingly, code classes shown in FIG. 11A to FIG. 11C all belong to the application layer in FIG. 13. An application start-up class, a whitelist constant management class, an accessibility service child class, and a screen recording parameter management class are included in the video note application of the application layer, and a screen recording service class and a screen recording model class are included in the screen recording application module of the application layer.

Figure 11A:
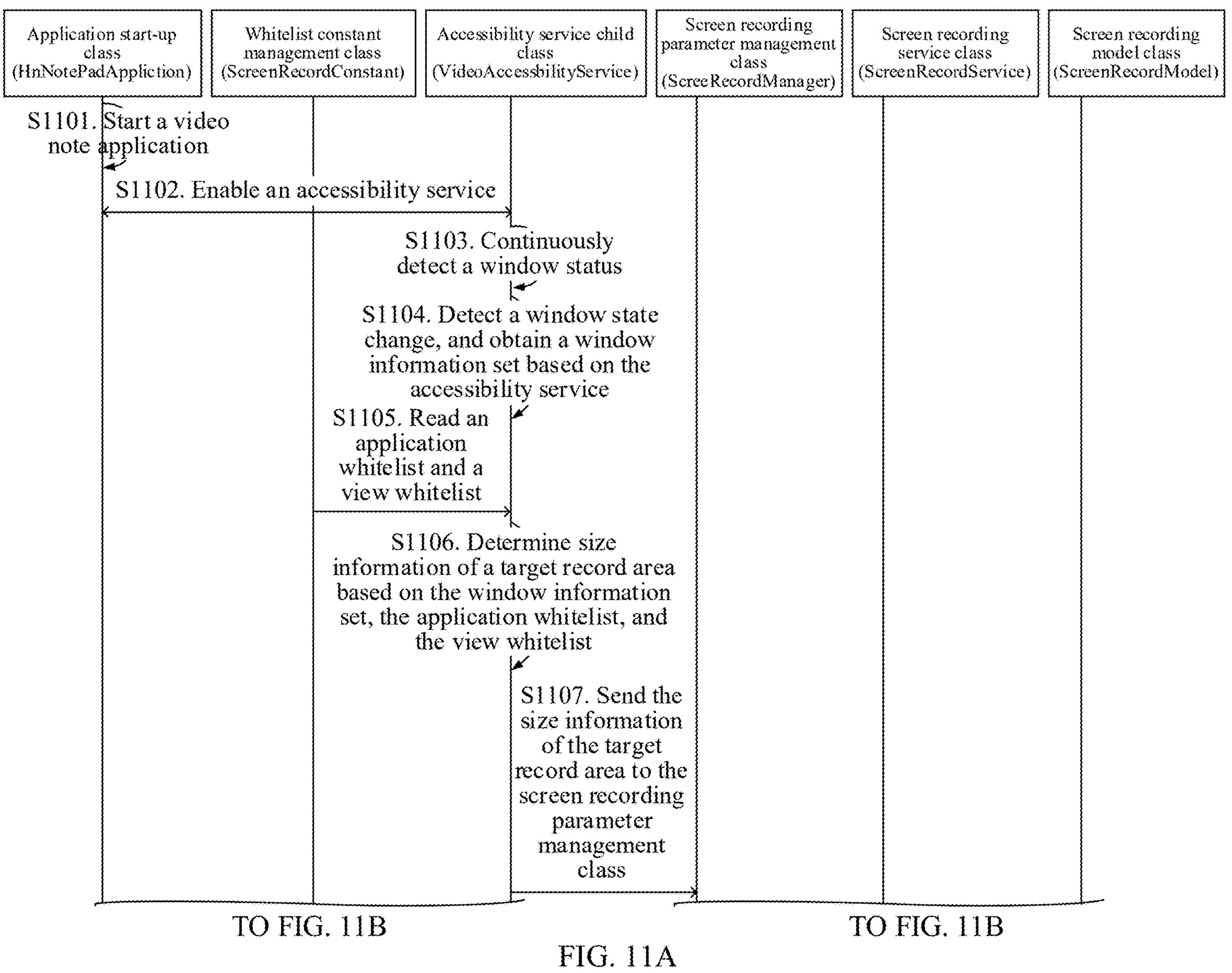
FIG. 11A to FIG. 11C are a timing flowchart of another screen recording method according to an embodiment of this application.
Figure 11B:
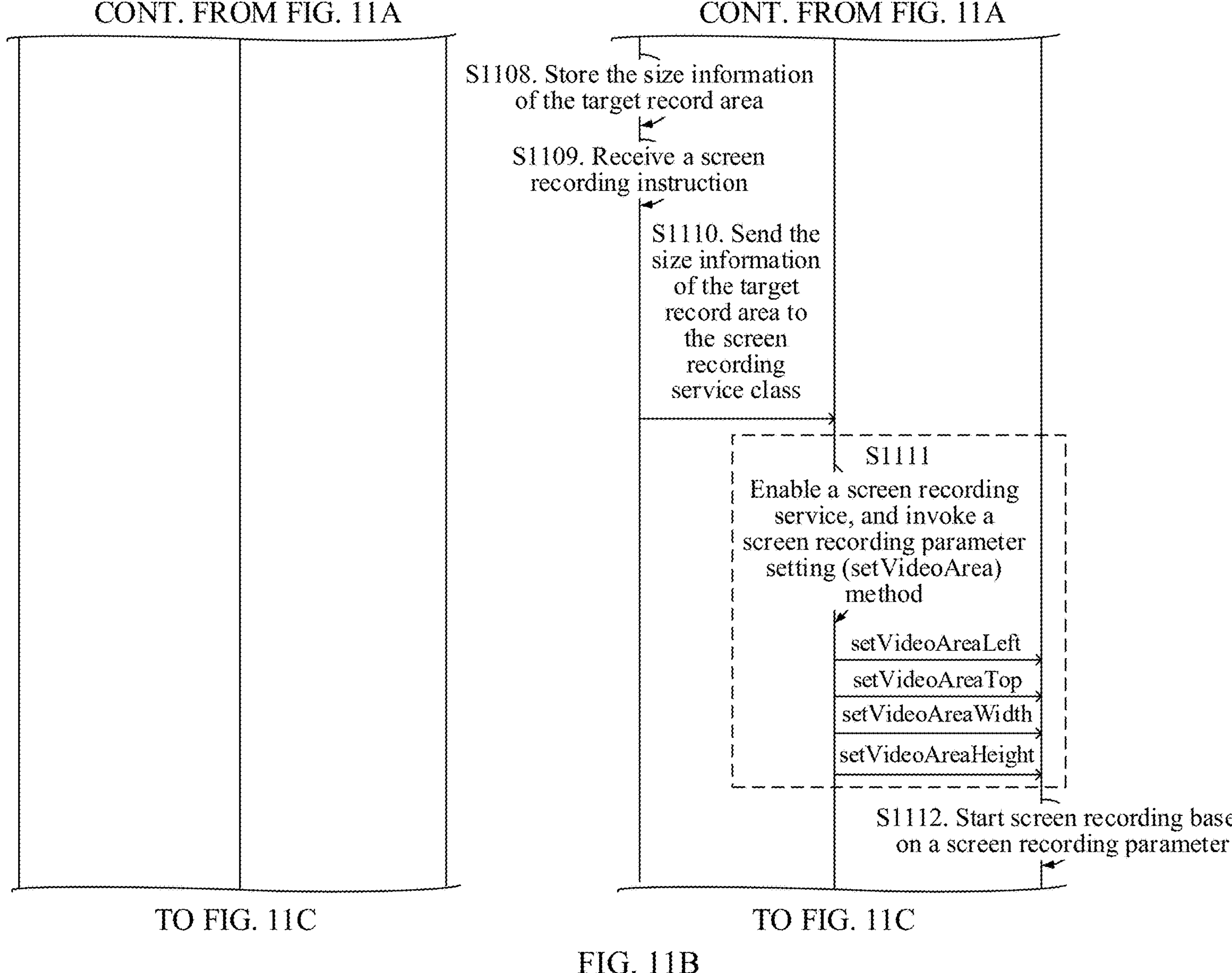
Figure 11C:
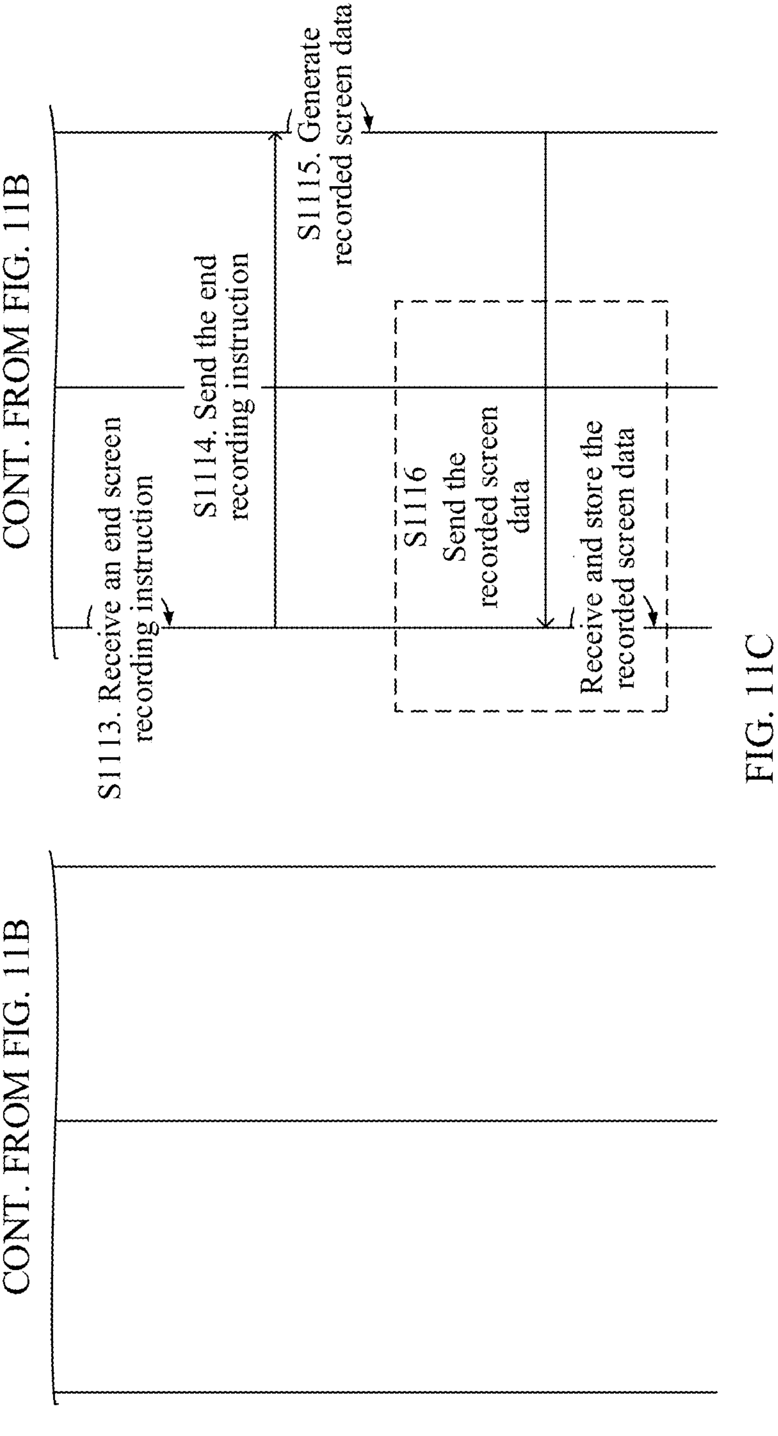

Specifically, as shown in FIG. 11A to FIG. 11C, the screen recording method provided in this embodiment of this application includes the following steps.

S1101. The application start-up class (HnNotePadApplication) starts the video note application.

In this embodiment of this application, the starting the video note application may also be understood as starting a video note function.

In this embodiment of this application, the HnNotePadApplication class is a functional module that is in the video note application and that is responsible for detecting a start-up request for the video note application, starting, after detecting the start-up request, a thread running the video note application, and displaying a related user interface on the electronic device.

For example, HnNotePadApplication starts and runs the video note application based on a tap/click operation on an application icon of the video note application.

For example, before starting and running the video note application, when detecting an operation instruction for the preset shortcut key for calling up the function bar of the video note application, HnNotePadApplication starts and runs the video note application.

Alternatively, HnNotePadApplication may start the video note application in other possible triggering manners. This is not limited herein.

In this embodiment of this application, the video note application may be system software of the electronic device, or may be third-party software. This is not limited herein.

S1102. Enable the accessibility service.

In this embodiment of this application, after HnNotePadApplication starts the video note application, the electronic device is requested to enable the system capability of the accessibility service parent class (accessibility service parent class) in the accessibility service module and invoke the accessibility service child class, and the accessibility service child class is started and run. The accessibility service child class is shown as VideoAccessbilityService in FIG. 11A to FIG. 11C. The accessibility service child class (VideoAccessbilityService) is a functional module that is in the video note application and that is configured to detect a window state change.

S1103. The accessibility service child class (VideoAccessbilityService) continuously detects a window status.

For details, refer to related descriptions in the foregoing step S703, which are not described herein again.

S1104. VideoAccessbilityService detects a window state change, and obtains a window information set based on the accessibility service.

For descriptions of the window information set, refer to related descriptions in the foregoing step S704. Details are not described herein again.

S1105. VideoAccessbilityService reads an application whitelist and a view whitelist from the whitelist constant management class (ScreenRecordConstant).

In this embodiment of this application, the whitelist constant management class (ScreenRecordConstant) is a functional module that is in the video note application and that is configured to record data of the application whitelist and the view whitelist. VideoAccessbilityService may obtain the data of the application whitelist and the view whitelist by accessing the ScreenRecordConstant class.

For detailed descriptions of the application whitelist and the view whitelist, refer to related descriptions in the foregoing step S706. Details are not described herein again.

S1106. VideoAccessbilityService determines size information of a target record area based on the window information set, the application whitelist, and the view whitelist.

For a specific execution method of determining the target record area, refer to the related descriptions in the foregoing step S706. Details are not described herein again.

S1107. VideoAccessbilityService sends the size information of the target record area to the screen recording parameter management class (ScreeRecordManager). Correspondingly, ScreeRecordManager receives the size information of the target record area.

In this embodiment of this application, the ScreeRecordManager class may be understood as a functional module that is in the video note application and that is configured to manage a screen recording parameter and respond to a start screen recording instruction and an end screen recording instruction.

S1108. ScreeRecordManager stores the size information of the target record area.

S1109. ScreeRecordManager receives a start screen recording instruction.

For detailed descriptions of the start screen recording instruction, refer to related descriptions in the foregoing step S706. Details are not described herein again.

In a possible implementation, when ScreeRecordManager receives the start screen recording instruction, VideoAccessbilityService also receives an event of a tap/click operation for the start screen recording instruction, and performs, after receiving the event of the tap/click operation for the start screen recording instruction, the foregoing steps S1104 and S1106 to determine whether the size information of the target record area needs to be updated. If the size information of the target record area needs to be updated, the size information of the target record area is updated. If the size information of the target record area does not need to be updated, the size information of the target record area is maintained unchanged.

It may be understood that, after the start screen recording instruction is received, changes in an interface displayed on the display screen generally include only a change from the start screen recording icon to the end screen recording icon, and displaying, in a floating-window manner in a display area at a lower right corner of the display screen, a video note document for recording recorded screen data. However, these changes correspond to changes in window information. Because the application whitelist provided in this application does not include identification information of the video note application, the size information of the target record area does not change. To be specific, even if a timing problem occurs between step S1110 and step S1106 or S1107, a problem that the size information of the target record area does not correspond to a current window is not caused. In an optional manner, to avoid a timing problem that the size information of the target record area used by the ScreeRecordManager class is not latest data because VideoAccessbilityService and ScreeRecordManager update the target record area based on the start screen recording instruction when the ScreeRecordManager class uses the size information of the target record area (for example, performs step S1110 of sending the size information of the target record area to the screen recording service class), or in other words, the used target record area is not the latest data because the size information of the target record area is sent to the screen recording service class before the target record area is updated, a timer corresponding to a second duration may be set, the timer is started after the recording instruction is received, and step S1110 is performed after the timer ends. For example, the first duration may be a total average duration during which step S1104 and step S1106 are performed in sample data.

In another possible implementation, after receiving the start screen recording instruction, ScreeRecordManager sends a first notification to VideoAccessbilityService, and after receiving an end screen recording instruction in step S1113, ScreeRecordManager sends a second notification to VideoAccessbility Service. After receiving the first notification, VideoAccessbility Service does not process a detected window state change, that is, steps S1104 to S1106 are not performed. Only after receiving the second notification, VideoAccessbility Service responds to a detected window state change, that is, steps S1104 to S1106 are performed.

S1110. ScreeRecordManager sends the size information of the target record area to the screen recording service class (ScreenRecordService). Correspondingly, ScreenRecordService receives the size information of the target record area.

In this embodiment of this application, the screen recording service class (ScreenRecordService) is a screen recording service interface in the screen recording application of the electronic device. The video note application may perform a screen recording task by invoking the screen recording application.

S1111. ScreenRecordService enables the screen recording service, and invokes a screen recording parameter setting (setVideoArea) method to set a screen recording parameter in the screen recording model class (ScreenRecordModel) to be consistent with the size information of the target record area.

For descriptions of the set VideoArea method and the ScreenRecordModel class, refer to related descriptions in the foregoing step S709.

For example, ScreenRecordService enables the screen recording service by using an onStarCommand method.

For example, the size information of the target record area and the screen recording parameter indicated by ScreenRecordModel include: a horizontal coordinate of an upper left corner vertex, a vertical coordinate of the upper left corner vertex, a width, and a height of a rectangular area. In this case, the invoking a screen recording parameter setting (setVideoArea) method to set a screen recording parameter in the screen recording model class (ScreenRecordModel) to be consistent with the size information of the target record area specifically includes: setting a horizontal coordinate of an upper left corner vertex of the screen recording parameter to the horizontal coordinate of the upper left corner vertex of the target record area (shown as set VideoAreaLeft in FIG. 11B), setting a vertical coordinate of the upper left corner vertex of the screen recording parameter to the vertical coordinate of the upper left corner vertex of the target record area (shown as setVideoAreaTop in FIG. 11B), setting a width of the screen recording parameter to the width of the target record area (shown as set VideoArea Width in FIG. 11B), and setting a height of the screen recording parameter to the height of the target record area (shown as set-VideoAreaHeight in FIG. 11B).

S1112. ScreenRecordModel starts screen recording based on the screen recording parameter.

S1113. ScreeRecordManager receives an end recording instruction.

S1114. ScreeRecordManager sends the end recording instruction to ScreenRecordModel. Correspondingly, ScreenRecordModel receives the end recording instruction.

S1115. ScreenRecordModel generates recorded screen data.

S1116. ScreenRecordModel sends the recorded screen data to ScreeRecordManager. Correspondingly, ScreeRecordManager receives and stores the recorded screen data.

For descriptions of the recorded screen data, specifically refer to related descriptions of the recorded screen data in the foregoing step S708 and/or related descriptions of the first video file, the video file A, the second video file, and a third video file. Details are not described herein again.

For example, after receiving the recorded screen data, ScreeRecordManager may store the recorded screen data, for example, may store the recorded screen data in a directory that is in the electronic device and that is configured to store data of the video note application, and establish, in the recorded screen data, an association relationship with a corresponding note document. In addition, after receiving the recorded screen data, ScreeRecordManager may further insert and display the recorded screen data in the corresponding note document of the video note application. For example, as shown in the user interface 1*d* in FIG. 3, the first preview image 2041 of the recorded screen data and the start playing icon 2043 are displayed in the preview area 204 of the note document 203, and the recorded screen data is played in response to a tap/click operation on the start playing icon 2043.

It may be understood that, the window status is detected based on the accessibility service provided by a Google native platform, and after a window state change is detected, an application identifier corresponding to a current window and a size corresponding to a view identifier are obtained based on some function methods for obtaining window information that are provided by the Google native platform. Because the accessibility service provided by the Google native platform has taken corresponding processing measures to protect user privacy, obtaining information through some open function interfaces for obtaining window information that are provided by the Google native platform does not involve privacy information related to personal information of the user. To further prevent a risk of user information disclosure, in a possible implementation, the electronic device may alternatively perform, after authorized by the user, screen recording by using the screen recording method provided in this application. For example, when using the video note application for the first time, the electronic device displays, to the user on the display screen, an overview of the screen recording method provided in this application, and applies for user authorization. After authorized, the electronic device performs screen recording by using the screen recording method provided in this application. Alternatively, a switch button function for performing screen recording by using the screen recording method provided in this application may be provided in the video note application to the user, and the overview of the screen recording method provided in this application is displayed on the display screen to the user in response to a user operation. The switch button is in an off state by default, and in the off state, the video note application performs screen recording in a full-screen manner by default. In response to an enabling operation performed by the user on the switch button, the electronic device performs screen recording by using the screen recording method provided in this application.

It may be understood that the screen recording method provided in this embodiment of this application may be performed by any electronic device that performs screen recording by using a target application and that is configured with an accessibility service function. The target application is an application having a screen recording function. For example, the target application may be the video note application, or the target application may be a video note function in a screen recording application owned by the electronic device, or the target application may be another third-party screen recording application. This is not limited herein. For example, the electronic device may be in a form of a non-foldable-screen mobile phone terminal, a foldable-screen mobile phone terminal, a tablet terminal, a notebook computer, a desktop computer, a laptop computer, or a handheld computer. This is not limited herein.

Figure 12:
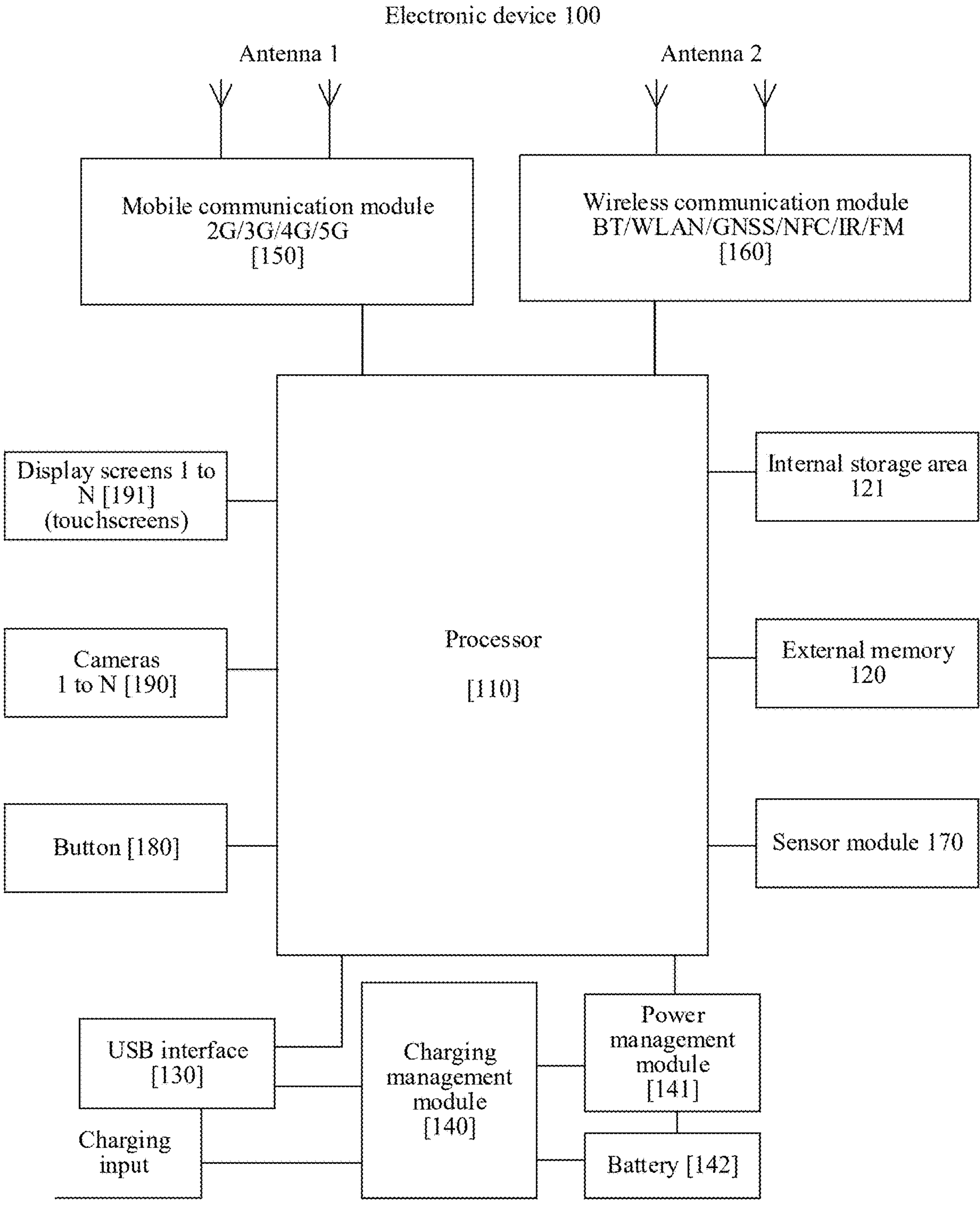
FIG. 12 is a diagram of a structure of an electronic device 100 according to an embodiment of this application.

For example, refer to FIG. 12. An electronic device 100 shown in FIG. 12 is used as an example to describe in detail a diagram of a structure of an electronic device provided in this application.

The electronic device 100 may include a processor 110, an external memory 120, an internal storage area 121, a universal serial bus (universal serial bus, USB) interface 130, a charging management module 140, a power management module 141, a battery 142, an antenna 1, an antenna 2, a mobile communication module 150, a wireless communication module 160, a sensor module 170, a button 180, a camera 190, and a display screen 191. The sensor module 170 may include a pressure sensor, a gyro sensor, a barometric pressure sensor, a magnetic sensor, an acceleration sensor, a distance sensor, an optical proximity sensor, a fingerprint sensor, a temperature sensor, a touch sensor, an ambient light sensor, a bone conduction sensor, and the like.

It may be understood that the structure shown in this embodiment of the present invention does not constitute a specific limitation on the electronic device 100. In some other embodiments of this application, the electronic device 100 may include more or fewer components than those shown in FIG. 12, or some components may be combined, or some components may be split, or components are arranged differently. The components shown in FIG. 12 may be implemented by hardware, software, or a combination of software and hardware. For example, the electronic device 100 may further include an audio module (a speaker, a receiver, a microphone, or a headset jack), a subscriber identity module (subscriber identification module, SIM) card interface, a motor, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on instruction operation code and a timing signal, to control instruction fetching and instruction execution.

A memory may be further disposed in the processor 110, to store instructions and data. In some embodiments, the memory in the processor 110 is a cache. The memory may store an instruction or data that has been just used or is cyclically used by the processor 110. If the processor 110 needs to use the instruction or the data again, the processor may directly invoke the instruction or the data from the memory. This avoids repeated access, and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like. It may be understood that an interface connection relationship between the modules that is shown in this embodiment of the present invention is merely an example for description, and does not constitute a limitation on the structure of the electronic device 100. In some other embodiments of this application, the electronic device 100 may alternatively use an interface connection manner different from that in the foregoing embodiment, or use a combination of a plurality of the interface connection manners.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 100 may be configured to cover one or more communication bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 150 may provide 2G/3G/4G/5G or other wireless communication solutions to be applied to the electronic device 100. The mobile communication module 150 may include at least one filter, a switch, a power amplifier, a low noise amplifier (low noise amplifier, LNA), and the like. The mobile communication module 150 may receive an electromagnetic wave by using the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation by using the antenna 1. In some embodiments, at least some functional modules of the mobile communication module 150 may be disposed in the processor 110. In some embodiments, at least some functional modules in the mobile communication module 150 may be disposed in a same component as at least some modules in the processor 110.

The modem processor may include a modulator and a demodulator. The modulator is configured to modulate a to-be-sent low-frequency baseband signal into an intermediate/high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transferred to the application processor. The application processor outputs a sound signal by using an audio device, or displays an image or a video on the display screen 191. In some embodiments, the modem processor may be an independent component. In some other embodiments, the modem processor may be independent of the processor 110, and is disposed in a same component as the mobile communication module 150 or another functional module.

The wireless communication module 160 may provide wireless local area network (wireless local area network, WLAN) (such as a wireless fidelity (wireless fidelity, Wi-Fi) network), Bluetooth (bluetooth, BT), global navigation satellite system (global navigation satellite system, GNSS), frequency modulation (frequency modulation, FM), near field communication (near field communication, NFC), infrared (infrared, IR), or other wireless communication solutions to be applied to the electronic device 100. The wireless communication module 160 may be one or more components integrating at least one communication processing module. The wireless communication module 160 receives an electromagnetic wave by using the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation by using the antenna 2.

In some embodiments, the antenna 1 of the electronic device 100 is coupled to the mobile communication module 150, and the antenna 2 is coupled to the wireless communication module 160, so that the electronic device 100 may communicate with a network and another device by using a wireless communication technology. The wireless communication technology may include a global system for mobile communication (global system for mobile communication, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, IR, and/or other technologies. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite-based augmentation system (satellite-based augmentation system, SBAS).

The electronic device 100 implements a display function by using the GPU, the display screen 191, the application processor, and the like. The GPU is a microprocessor for image processing, and is connected to the display screen 191 and the application processor. The GPU is configured to perform mathematical and geometric calculation for graphics rendering. The processor 110 may include one or more GPUs that execute a program instruction to generate or change display information.

For example, in this embodiment of this application, a combination of one or more physical buttons in the button 180 is used as a shortcut key for calling up the function bar 10 shown in FIG. 1. After receiving a shortcut key instruction for the function bar 10 based on the button 180, the electronic device displays the function bar 10 on the display screen 191. In addition, after receiving a touch operation on the start screen recording icon 104 in the function bar 10 based on the display screen 191, display content in a target record area is recorded.

The electronic device 100 may implement a photographing function by using the ISP, the camera 190, the video codec, the GPU, the display screen 191, the application processor, and the like.

The external memory 120 may be configured to connect to an external memory card, for example, a Micro SD card, to expand a storage capability of the electronic device 100. The external memory card communicates with the processor 110 through the external memory 120, to implement a data storage function. For example, music, video, or other files are stored in the external memory card.

The internal storage area 121 may be configured to store computer-executable program code. The executable program code includes instructions. The processor 110 runs the instructions stored in the internal storage area 121, to execute various function applications and data processing of the electronic device 100. The internal storage area 121 may include a program storage area and a data storage area. The program storage area may store an operating system, an application program required by at least one function (for example, a voice playing function or an image playing function), and the like. The data storage area may store data (such as audio data and an address book) created during use of the electronic device 100, and the like. In addition, the internal storage area 121 may include a high-speed random access memory, or may include a non-volatile memory, for example, at least one magnetic disk storage, a flash memory, or a universal flash storage (universal flash storage, UFS).

FIG. 13 is a block diagram of a software structure of the electronic device 100 according to an embodiment of this application.

In the layered architecture, software is divided into several layers, and each layer has a clear role and task. The layers communicate with each other through a software interface. In some embodiments, a system is divided into four layers from top to bottom: an application layer, an application framework layer, a runtime (Runtime) and a system library, and a kernel layer.

The application layer may include a series of application program packages.

As shown in FIG. 13, the application program packages in the application layer may include but are not limited to a screen recording application module, and camera, call, WLAN, music, video, and other application programs (which may also be referred to as applications (application, App)).

In this embodiment of this application, the application layer may further include a video note application module. The video note application module is configured to perform the screen recording method in embodiments of this application.

Alternatively, in some other possible implementations, the video note application module may be located in another layer of the software architecture, for example, the application framework layer, the system library, or the kernel layer. This is not limited herein.

The application framework layer provides an application programming interface (application programming interface, API) and a programming framework for the application programs in the application layer. The application framework layer includes some predefined functions.

As shown in FIG. 13, the application framework layer may include a window manager, a content provider, a view system, a phone manager, a resource manager, a notification manager, and the like. In this application, the application framework layer may further include an accessibility service module.

The window manager is configured to manage a window program. The content provider is configured to store and obtain data, and make the data accessible to application programs. The view system includes a visual control, for example, a control for text display or a control for image display. The view system may be configured to construct an application program. The phone manager is configured to provide a communication function of the electronic device 100, The resource manager provides application programs with various resources, such as localized strings, icons, images, layout files, and video files. The notification manager allows application programs to display notification information in a status bar, which may be used to convey notification-type messages, and may automatically disappear without user interaction after a short stay.

For example, in this application, the video note application module in the application layer implements an accessibility service child class based on the accessibility service module, and detects a window status based on the accessibility service child class. Specifically, after a window state change is detected, the window manager (a window management service) in the application framework layer may send corresponding AccessibilityEvent to the accessibility service child class based on an event callback function. For example, when the video note application receives a tap/click operation on the start screen recording icon, the window manager may detect an event related to the tap/click operation on the start screen recording icon, and send corresponding AccessibilityEvent to the accessibility service child class. After the accessibility service child class receives AccessibilityEvent, the video note application determines the window state change, obtains a window information set based on the accessibility service child class, determines a target record area based on the window information set, an application whitelist, and a view whitelist, and records the target record area. For details, refer to detailed descriptions of related method embodiments herein, which are not described herein again.

The runtime (Runtime) includes a kernel library and a virtual machine. Runtime is responsible for scheduling and managing the system.

The kernel library includes two parts: One part is a function that needs to be invoked by a programming language (for example, a jave language), and the other part is a kernel library of the system.

The application layer and the application framework layer may run on the virtual machine. The virtual machine may execute programming files (for example, jave files) of the application layer and the application framework layer as binary files. The virtual machine is configured to perform object life cycle management, stack management, thread management, security and exception management, garbage collection, and other functions.

The system library include a plurality of functional modules, for example, a surface manager (surface manager), a media library (Media Libraries), a three-dimensional graphics processing library (for example, OpenGL ES), and a two-dimensional graphics engine (for example, SGL).

The kernel layer is a layer between hardware and software. The kernel layer may include a display driver, a camera driver, an audio driver, a sensor driver, and the like.

As used in the foregoing embodiments, the term "when . . . " may be interpreted to mean "if . . . ", "after . . . ", "in response to determining that . . . ", or "in response to detecting that . . . " depending on a context. Similarly, the phrase "when it is determined that . . . " or "if a (stated condition or event) is detected" may be interpreted to mean "if it is determined that . . . ", "in response to determining that . . . ", "when a (stated condition or event) is detected", or "in response to detecting a (stated condition or event)" depending on a context.

All or a part of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, all or a part of the procedures or functions according to embodiments of this application are generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a soft disk, a hard disk drive, or a magnetic tape), an optical medium (for example, a DVD), a semiconductor medium (for example, a solid state drive), or the like.

Persons of ordinary skill in the art may understand that all or a part of the procedures of the methods in the foregoing embodiments may be implemented by a computer program instructing related hardware. The program may be stored in a computer-readable storage medium. When the program runs, the procedures of the foregoing method embodiments are performed. The storage medium includes any medium that can store program code, such as a ROM, a random access memory RAM, a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

The invention claimed is:

1. A screen recording method, comprising:

starting a first application, and displaying a first interface of the first application, wherein the first interface comprises a first area and a second area, the first area is a video playing area, and the second area is a non-video-playing area;

in response to a user operation of calling up a function bar of a video note application, displaying the function bar, wherein the function bar comprises a start recording button, and the video note application comprises a screen recording function;

in response to a first tap/click operation on the start recording button, recording, by using the video note application, display content corresponding to the first area without user's selection of a recording region, and displaying an end recording button and skipping displaying the start recording button in the function bar;

in response to a first tap/click operation on the end recording button, ending recording to obtain a first video, and displaying the start recording button and skipping displaying the end recording button in the function bar, wherein the first video comprises the display content in the first area and does not comprise display content in the second area;

in response to a first user operation, displaying a second interface of the first application, wherein the second interface does not comprise a video playing area;

in response to a second tap/click operation on the start recording button, recording display content of an entire interface of the second interface by using the video note application without user's selection of a recording region, and displaying the end recording button and skipping displaying the start recording button in the function bar; and in response to a second tap/click operation on the end recording button, ending recording to obtain a second video, and displaying the start recording button and skipping displaying the end recording button in the function bar, wherein the second video comprises all the display content of the second interface, wherein the first application is included in an application whitelist, a view corresponding to the first area is included in a view whitelist, and a view corresponding to the second area is not included in the view whitelist, the application whitelist is used to record a preset list of applications for which the video note application supports recording and the view whitelist is used to record a preset list of views for which the video note application supports recording.

2. The method according to claim 1, wherein after the ending recording, the method further comprises:

in response to a second user operation, displaying the second interface and an interface of a second application in a split-screen display manner, wherein the interface of the second application does not comprise a video playing area;

in response to a third tap/click operation on the start recording button, recording the display content of the entire interface of the second interface by using the video note application, and displaying the end recording button and skipping displaying the start recording button in the function bar; and in response to a third tap/click operation on the end recording button, ending recording to obtain a third video, and displaying the start recording button and skipping displaying the end recording button in the function bar, wherein the third video comprises all the display content of the second interface and does not comprise display content of the interface of the second application.

3. The method according to claim 1, wherein after the ending recording, the method further comprises:

in response to a third user operation, displaying an interface of a second application and an interface of a third application in a split-screen display manner, wherein the interface of the third application does not comprise a video playing area;

in response to a fourth tap/click operation on the start recording button, recording display content in an entire display area of a display screen by using the video note application, and displaying the end recording button and skipping displaying the start recording button in the function bar; and in response to a fourth tap/click operation on the end recording button, ending recording to obtain a fourth video, wherein the fourth video comprises display content of the interface of the second application and the interface of the third application.

4. The method according to claim 1, further comprising:

in response to the first tap/click operation on the start recording button, displaying an interface of the video note application in a floating-window display manner, and displaying a preview image in a preview area of the interface of the video note application; and displaying a preview image and a start playing icon in the preview area in response to the first tap/click operation on the end recording button, and playing the first video in response to a tap/click operation on the start playing icon.

5. The method according to claim 3, wherein the second application nor the third application is comprised in the application whitelist, and each view in the view whitelist comes from a corresponding application in the application whitelist.

6. The method according to claim 1, wherein after the displaying the function bar, and before the recording, by using the video note application, display content corresponding to the first area, the method further comprises:

obtaining a first window information set, wherein the first window information set is a set of window information of at least one window displayed on a display screen, and the first window information set comprises window information of the first interface;

obtaining a first set based on the first window information set and the application whitelist, wherein each application in the first set is comprised in the first window information set and comprised in the application whitelist, and the first set comprises the first application; and obtaining size information of a target view based on the first set, the view whitelist, and the first window information set, and determining that size information of a target record area is the size information of the target view, wherein the target view is a view that is in the view whitelist and that is corresponding to the first application, and the target view is the view corresponding to the first area; and the recording, by using the video note application, display content corresponding to the first area comprises:

recording, based on the size information of the target view recorded by the target record area, the display content corresponding to the first area.

7. The method according to claim 6, wherein the obtaining size information of a target view based on the first set, the view whitelist, and the first window information set, and determining that size information of a target record area is the size information of the target view comprises:

obtaining size information of a first reference view based on the first window information set according to an address of an element in the first set, wherein the first reference view is a view that is in the view whitelist and that is corresponding to a first reference application, and the first reference application is an application that is in the first set and that is corresponding to the address of the element; and determining, if the size information of the target view is obtained and an element address of the first application in the first set is greater than an element address of any target application, that the size information of the target record area is the size information of the target view, wherein the target application is comprised in the first set, size information of a view corresponding to the target application is a valid value, and the target application is not the first application.

8. The method according to claim 1, wherein after the displaying a second interface of the first application, and before the recording display content of an entire interface of the second interface by using the video note application, the method further comprises:

obtaining a second window information set, wherein the second window information set is a set of window information of at least one window displayed on a display screen, and the second window information set comprises window information of the second interface;

obtaining a second set based on the second window information set and the application whitelist, wherein each application in the second set is comprised in the second window information set and comprised in the application whitelist, and the second set comprises the first application; and determining, if size information corresponding to an identifier of a target view fails to be obtained based on the second set, the view whitelist, and the second window information set, that size information of a target record area is size information of an entire display area of the second interface, wherein the target view is a view that is in the view whitelist and that is corresponding to the first application; and the recording display content of an entire interface of the second interface by using the video note application comprises:

recording the display content of the entire interface of the second interface based on the size information of the entire display area of the second interface recorded by the target record area.

9. The method according to claim 8, wherein the determining, if size information corresponding to an identifier of a target view fails to be obtained based on the second set, the view whitelist, and the second window information set, that size information of a target record area is size information of an entire display area of the second interface, wherein the target view is a view that is in the view whitelist and that is corresponding to the first application comprises:

obtaining size information of a second reference view based on the second window information set according to an address of an element in the second set, wherein the second reference view is a view that is in the view whitelist and that is corresponding to a second reference application, and the second reference application is an application that is in the second set and that is corresponding to the address of the element; and determining, if the size information of the second reference view fails to be obtained, that the size information of the target record area is the size information of the entire display area of the second interface.

10. The method according to claim 5, wherein each element in the application whitelist is identification information of an application comprising a video playing function, and each element in the view whitelist is identification information of a view configured to play video data.

11. The method according to claim 1, further comprising automatically determining the recording area without receiving an user input to define a recording region.

12. An electronic device, comprising:

one or more processors, a memory, and a display screen, wherein the memory is coupled to the one or more processors, the memory is configured to store computer program code, the computer program code comprises computer instructions, and the one or more processors invoke the computer instructions to enable the electronic device to perform a method, the method comprising:

starting a first application, and displaying a first interface of the first application, wherein the first interface comprises a first area and a second area, the first area is a video playing area, and the second area is a non-video-playing area;

in response to a user operation of calling up a function bar of a video note application, displaying the function bar, wherein the function bar comprises a start recording button, and the video note application comprises a screen recording function;

in response to a first tap/click operation on the start recording button, recording, by using the video note application, display content corresponding to the first area, and displaying an end recording button and skipping displaying the start recording button in the function bar;

in response to a first tap/click operation on the end recording button, ending recording to obtain a first video, and displaying the start recording button and skipping displaying the end recording button in the function bar, wherein the first video comprises the display content in the first area and does not comprise display content in the second area;

in response to a first user operation, displaying a second interface of the first application, wherein the second interface does not comprise a video playing area;

in response to a second tap/click operation on the start recording button, recording display content of an entire interface of the second interface by using the video note application, and displaying the end recording button and skipping displaying the start recording button in the function bar; and in response to a second tap/click operation on the end recording button, ending recording to obtain a second video, and displaying the start recording button and skipping displaying the end recording button in the function bar, wherein the second video comprises all the display content of the second interface, wherein the first application is included in an application whitelist, a view corresponding to the first area is included in a view whitelist, and a view corresponding to the second area is not included in the view whitelist, the application whitelist is used to record a preset list of applications for which the video note application supports recording and the view whitelist is used to record a preset list of views for which the video note application supports recording.

13. The electronic device according to claim 12, wherein after the ending recording, the method further comprises:

in response to a second user operation, displaying the second interface and an interface of a second application in a split-screen display manner, wherein the interface of the second application does not comprise a video playing area;

in response to a third tap/click operation on the start recording button, recording the display content of the entire interface of the second interface by using the video note application, and displaying the end recording button and skipping displaying the start recording button in the function bar; and in response to a third tap/click operation on the end recording button, ending recording to obtain a third video, and displaying the start recording button and skipping displaying the end recording button in the function bar, wherein the third video comprises all the display content of the second interface and does not comprise display content of the interface of the second application.

14. The electronic device according to claim 12, wherein after the ending recording, the method further comprises:

in response to a third user operation, displaying an interface of a second application and an interface of a third application in a split-screen display manner, wherein the interface of the third application does not comprise a video playing area;

in response to a fourth tap/click operation on the start recording button, recording display content in an entire display area of a display screen by using the video note application, and displaying the end recording button and skipping displaying the start recording button in the function bar; and in response to a fourth tap/click operation on the end recording button, ending recording to obtain a fourth video, wherein the fourth video comprises display content of the interface of the second application and the interface of the third application.

15. The electronic device according to claim 12, wherein the method further comprises:

in response to the first tap/click operation on the start recording button, displaying an interface of the video note application in a floating-window display manner, and displaying a preview image in a preview area of the interface of the video note application; and displaying a preview image and a start playing icon in the preview area in response to the first tap/click operation on the end recording button, and playing the first video in response to a tap/click operation on the start playing icon.

16. The electronic device according to claim 14, wherein the first application is comprised in an application whitelist, a view corresponding to the first area is comprised in a view whitelist, a view corresponding to the second area is not comprised in the view whitelist, neither the second application nor the third application is comprised in the application whitelist, the application whitelist is used to record a preset list of applications for which the video note application supports recording, the view whitelist is used to record a preset list of views for which the video note application supports recording, and each view in the view whitelist comes from a corresponding application in the application whitelist.

17. The electronic device according to claim 12, wherein after the displaying the function bar, and before the recording, by using the video note application, display content corresponding to the first area, the method further comprises:

obtaining a first window information set, wherein the first window information set is a set of window information of at least one window displayed on the display screen, and the first window information set comprises window information of the first interface;

obtaining a first set based on the first window information set and the application whitelist, wherein each application in the first set is comprised in the first window information set and comprised in the application whitelist, and the first set comprises the first application; and obtaining size information of a target view based on the first set, the view whitelist, and the first window information set, and determining that size information of a target record area is the size information of the target view, wherein the target view is a view that is in the view whitelist and that is corresponding to the first application, and the target view is the view corresponding to the first area; and the recording, by using the video note application, display content corresponding to the first area comprises:

recording, based on the size information of the target view recorded by the target record area, the display content corresponding to the first area.

18. The electronic device according to claim 17, wherein the obtaining size information of a target view based on the first set, the view whitelist, and the first window information set, and determining that size information of a target record area is the size information of the target view comprises:

obtaining size information of a first reference view based on the first window information set according to an address of an element in the first set, wherein the first reference view is a view that is in the view whitelist and that is corresponding to a first reference application, and the first reference application is an application that is in the first set and that is corresponding to the address of the element; and determining, if the size information of the target view is obtained and an element address of the first application in the first set is greater than an element address of any target application, that the size information of the target record area is the size information of the target view, wherein the target application is comprised in the first set, size information of a view corresponding to the target application is a valid value, and the target application is not the first application.

19. The electronic device according to claim 12, wherein after the displaying a second interface of the first application, and before the recording display content of an entire interface of the second interface by using the video note application, the method further comprises:

obtaining a second window information set, wherein the second window information set is a set of window information of at least one window displayed on the display screen, and the second window information set comprises window information of the second interface;

obtaining a second set based on the second window information set and the application whitelist, wherein each application in the second set is comprised in the second window information set and comprised in the application whitelist, and the second set comprises the first application; and determining, if size information corresponding to an identifier of a target view fails to be obtained based on the second set, the view whitelist, and the second window information set, that size information of a target record area is size information of an entire display area of the second interface, wherein the target view is a view that is in the view whitelist and that is corresponding to the first application; and the recording display content of an entire interface of the second interface by using the video note application comprises:

recording the display content of the entire interface of the second interface based on the size information of the entire display area of the second interface recorded by the target record area.

20. A chip system, comprising:

a processor, wherein the processor is configured to invoke computer instructions to perform a method, the method comprising:

starting a first application, and displaying a first interface of the first application, wherein the first interface comprises a first area and a second area, the first area is a video playing area, and the second area is a non-video-playing area;

in response to a user operation of calling up a function bar of a video note application, displaying the function bar, wherein the function bar comprises a start recording button, and the video note application comprises a screen recording function;

in response to a first tap/click operation on the start recording button, recording, by using the video note application, display content corresponding to the first area, and displaying an end recording button and skipping displaying the start recording button in the function bar;

in response to a first tap/click operation on the end recording button, ending recording to obtain a first video, and displaying the start recording button and skipping displaying the end recording button in the function bar, wherein the first video comprises the display content in the first area and does not comprise display content in the second area;

in response to a first user operation, displaying a second interface of the first application, wherein the second interface does not comprise a video playing area;

in response to a second tap/click operation on the start recording button, recording display content of an entire interface of the second interface by using the video note application, and displaying the end recording button and skipping displaying the start recording button in the function bar; and in response to a second tap/click operation on the end recording button, ending recording to obtain a second video, and displaying the start recording button and skipping displaying the end recording button in the function bar, wherein the second video comprises all the display content of the second interface, wherein the first application is included in an application whitelist, a view corresponding to the first area is included in a view whitelist, and a view corresponding to the second area is not included in the view whitelist, the application whitelist is used to record a preset list of applications for which the video note application supports recording and the view whitelist is used to record a preset list of views for which the video note application supports recording.

* * * * *